US009164246B2

(12) United States Patent
Isenhour et al.

(10) Patent No.: US 9,164,246 B2
(45) Date of Patent: Oct. 20, 2015

(54) DOCKING STATIONS, ELECTRONIC DEVICES, AND FIBER OPTIC CABLE ASSEMBLIES HAVING A MAGNETIC OPTICAL CONNECTION

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US); Percil Watkins, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 190 days.

(21) Appl. No.: 13/891,851

(22) Filed: May 10, 2013

(65) Prior Publication Data

US 2014/0072261 A1   Mar. 13, 2014

Related U.S. Application Data

(60) Provisional application No. 61/699,102, filed on Sep. 10, 2012, provisional application No. 61/699,081, filed on Sep. 10, 2012.

(51) Int. Cl.
| G02B 6/38 | (2006.01) |
| G02B 6/42 | (2006.01) |
| G02B 6/32 | (2006.01) |
| G02B 6/36 | (2006.01) |
| G06F 1/16 | (2006.01) |

(52) U.S. Cl.
CPC ............... *G02B 6/3886* (2013.01); *G02B 6/32* (2013.01); *G02B 6/36* (2013.01); *G02B 6/4292* (2013.01); *G06F 1/1632* (2013.01); *G02B 6/425* (2013.01); *G02B 6/4214* (2013.01); *G02B 6/4246* (2013.01)

(58) Field of Classification Search
None
See application file for complete search history.

(56) References Cited

U.S. PATENT DOCUMENTS

| 7,103,698 | B2 | 9/2006 | Zhang et al. ................. 710/303 |
| 2012/0007705 | A1 | 1/2012 | Fullerton et al. ............. 335/306 |
| 2012/0021619 | A1 | 1/2012 | Bilbrey et al. ................. 439/39 |
| 2012/0155803 | A1 | 6/2012 | Benjamin et al. .............. 385/33 |
| 2012/0195556 | A1 | 8/2012 | Wang et al. .................... 385/77 |
| 2012/0213475 | A1 | 8/2012 | Selli et al. ..................... 385/33 |

FOREIGN PATENT DOCUMENTS

| JP | H09 318852 A | 12/1997 | ............ G02B 6/42 |

OTHER PUBLICATIONS

Patent Cooperation Treaty International Search Report and Written Opinion for International Application No. PCT/US2013/058393; mailing date Dec. 3, 2013—11 pages.

*Primary Examiner* — Jerry Rahill

(57) ABSTRACT

Docking stations, electronic devices, fiber optic cable assemblies, and display devices incorporating optical connections including a magnetic coupling portion are disclosed. One embodiment of the disclosure relates to a docking station for an electronic device having a major surface. The docking station includes a mating surface operable to contact a major surface of an electronic device, and an optical connection disposed in the mating surface. The optical connection includes an optical interface portion and a magnetic coupling portion positioned adjacent to the optical interface portion. Another embodiment of the disclosure relates to an electronic device including a major surface having a cavity, and an optical connection disposed in the cavity. The optical connection includes an optical interface portion and a magnetic coupling portion positioned adjacent to the optical interface portion. The optical interface portion is offset from the major surface. Display devices are also disclosed.

25 Claims, 19 Drawing Sheets

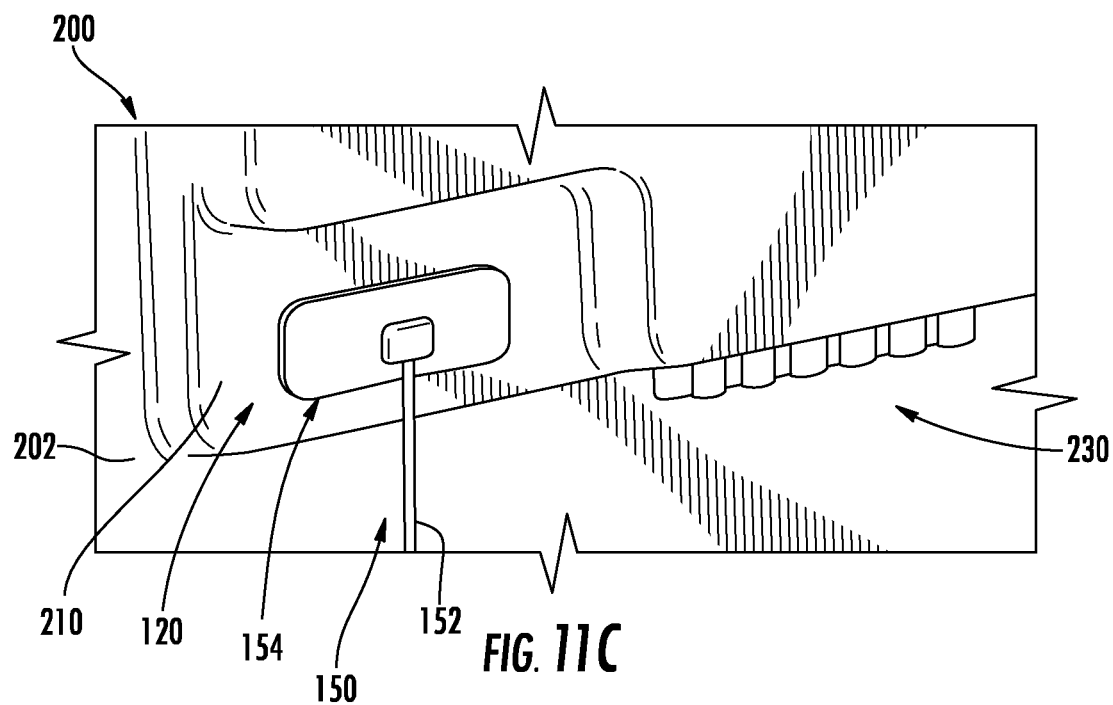

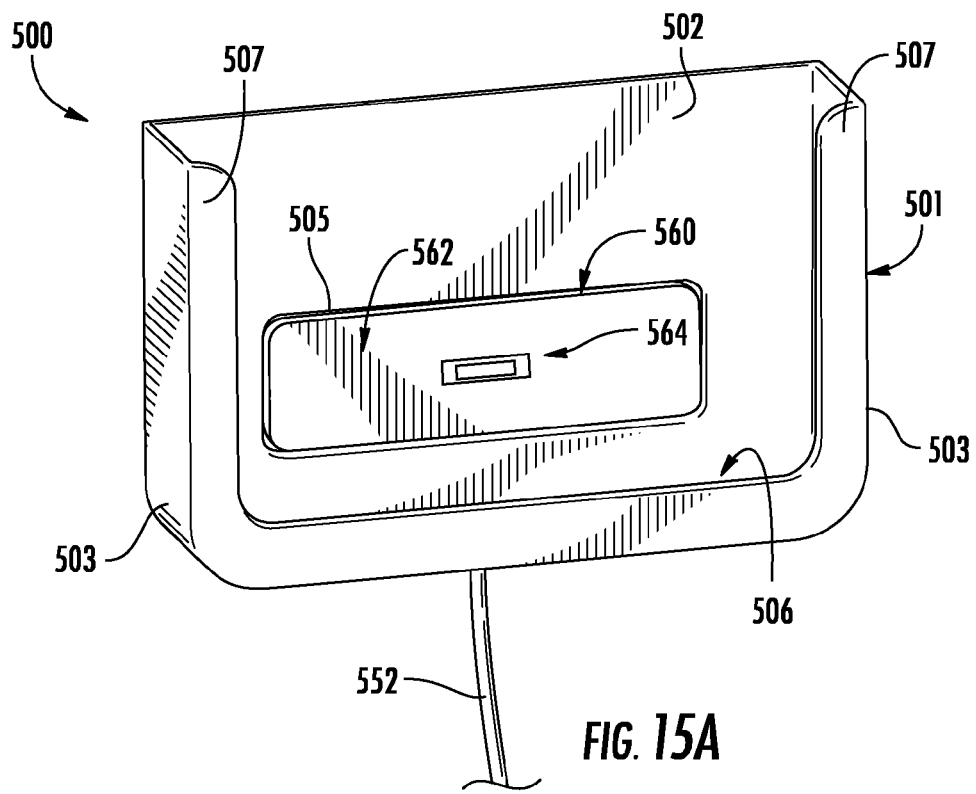
FIG. 15A
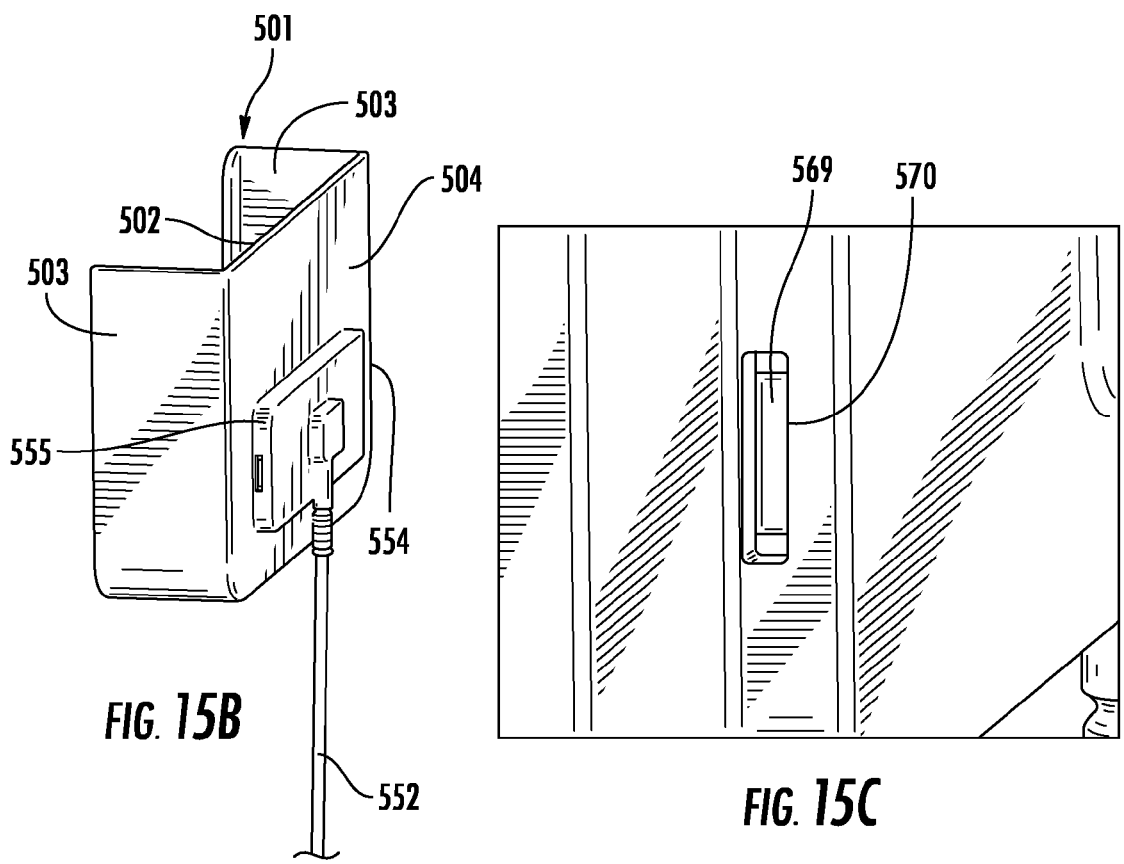
FIG. 15B
FIG. 15C

DOCKING STATIONS, ELECTRONIC DEVICES, AND FIBER OPTIC CABLE ASSEMBLIES HAVING A MAGNETIC OPTICAL CONNECTION

CROSS-REFERENCE TO RELATED APPLICATIONS

This application claims the benefit of priority under 35 U.S.C. §119 of U.S. Provisional Application Ser. Nos. 61/699,102 filed on Sep. 10, 2012, and 61/699,081 filed on Sep. 10, 2012 the contents of which are relied upon and incorporated herein by reference in its entirety.

BACKGROUND

The disclosure relates generally to devices having an optical connection for optical communication and, more particularly, docking stations and electronic devices incorporating optical connections that utilize magnetic force for both coupling and alignment.

SUMMARY

One embodiment of the disclosure relates to a docking station for an electronic device surface for mating such as having a major surface. The docking station includes a mating surface operable to contact a major surface of an electronic device, and an optical connection disposed in the mating surface. The optical connection includes an optical interface portion and a magnetic coupling portion positioned adjacent to the optical interface portion.

Another embodiment of the disclosure relates to an electronic device including a major surface having a cavity, and an optical connection disposed in the cavity. The optical connection includes an optical interface portion and a magnetic coupling portion positioned adjacent to the optical interface portion. The optical interface portion is offset from the major surface.

Yet another embodiment of the disclosure relates to a display device having an optical connection disposed in a mating surface. The optical connection includes a lens block and a magnetic coupling portion disposed about at least a portion of the lens block. The lens block includes an optical interface portion that defines an in-line optical path without an optical turn for optical signals propagating through the lens block.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 11C is a close-up view of a fiber optic cable assembly coupled to the optical connection of the display device depicted in FIG. 11A;

FIG. 15A is a front perspective view of a docking station for a mobile device having an optical connection;

FIG. 15B is a side and rear perspective view of the docking station depicted in FIG. 15A;

FIG. 15C is a close-up view of an opening within a side of the docking station depicted in FIGS. 15A and 15B;

DETAILED DESCRIPTION

Figure 1:
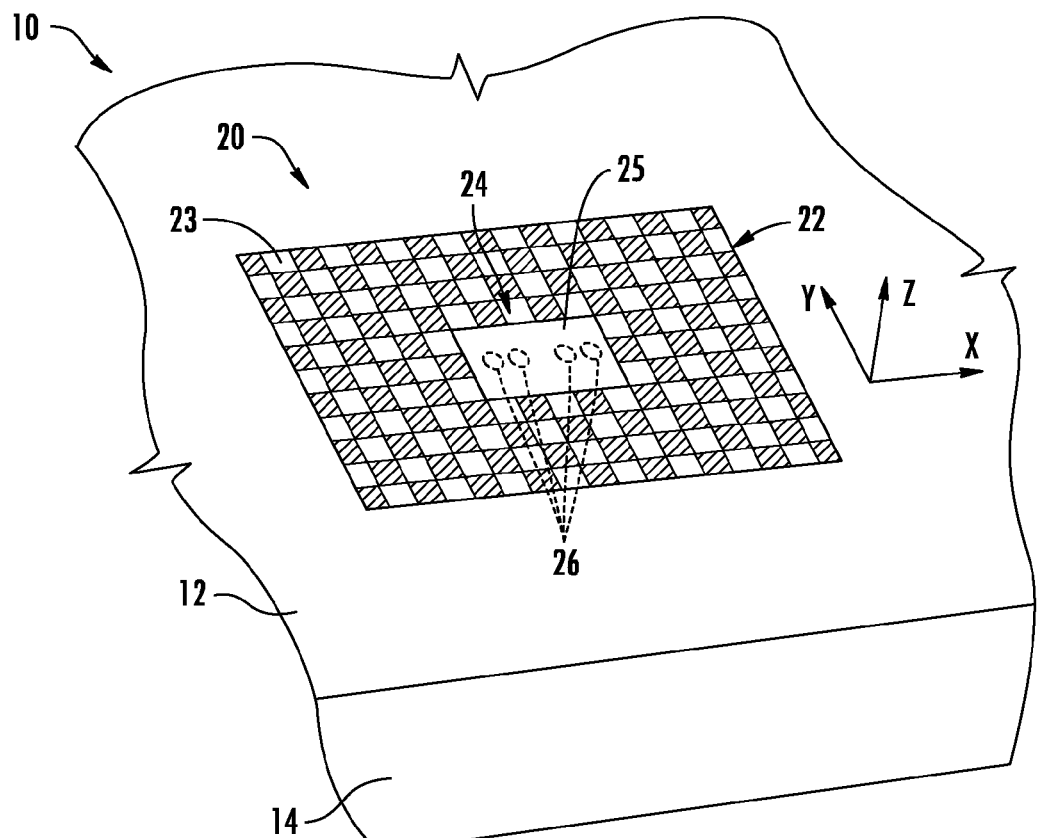
FIG. 1 is a partial top-down elevated view of an example optical connection of an electronic device according to one or more embodiments of the disclosure.

Embodiments are directed to optical connections, such as optical connection utilized by fiber optic cable assemblies and electronic devices, wherein electrical signals generated by a host or client electronic device are converted to optical signals by a transceiver circuit and transmitted over one or more optical fibers. Optical signals received by a host or client electronic device are converted from optical signals into electrical signals by the transceiver circuit. The optical connections disclosed herein may allow for high-bandwidth speed communication to and/or from an electronic device. As an example and not a limitation, the optical connections described herein may be utilized in electronic devices in conjunction with a fiber network wherein optical fiber is routed throughout a home or place of business (e.g., an in-home fiber network or business fiber network). Conventional copper connectors and cabling are reaching bandwidth limitations as bandwidth requirements are ever increasing due to data-intensive applications, such as cloud computing, high definition television, ultra high definition television, and the like.

Embodiments described herein may enable planar, liquid-displacing optical interface portions to precisely align optical components of coupled device (e.g., optical fibers and/or active components, such as laser and photodiodes) without significant mechanical structure. The term planar means generally flat such that the optical interface portion is accessible and easily wiped by a user. In some embodiments, the optical interface portion may comprise some structural features but the region of optical coupling may remain substantially planar. Embodiments use coded magnetic arrays to precisely align optical channels of the coupled devices. The coded magnetic arrays also provide a magnetic force to maintain a coupled relationship between the optical connections of the coupled devices. Optical connections, as well as electronic devices, optical interface systems, and methods of making optical connections will be described in further detail herein with specific reference to the appended figures.

Embodiments described herein are generally directed to optical connections suitable for use on an electronic device (e.g., a computer, a smart phone, a docking station, a tablet computer, and the like) and/or a fiber optic cable assembly having magnetic coupling portions for both alignment and retention. In some embodiments, at least one fiducial provides coarse alignment (i.e., alignment) of the optical connection between an optical interface portion disposed on the electronic device and an optical interface portion of the cable assembly by guiding the placement of the magnetic coupling portion disposed on the optical connection with the complementary magnetic coupling portion of the cable assembly, and the magnetic coupling portion provides fine alignment and/or the retention (i.e., the retention force) of the optical connection at the optical interface portions between the optical connection, such as on a device with the cable assembly.

In embodiments, an optical connection having an in-line optical path may be disposed in a major surface of a housing of an electronic device. As used herein, the phrase "in-line optical path" means that optical signals propagating within the optical connection are not redirected or otherwise turned. As used herein, the phrase "major surface" means a large surface of an electronic device, such as a backside of a smart phone or a laptop computer, and the phrase "minor surface" means a small surface of an electronic device, such as the edge of a smart phone or a laptop computer, for example.

Referring initially to FIG. 1, a schematic illustration of an optical connection 20 provided within a major surface 12 of an electronic device 10 is illustrated. The electronic device 10 may be any electronic device, including, but not limited to, a portable media player, a cellular phone (e.g., a "smart phone") a data storage device (e.g., an external hard drive or a flash-based memory device), a digital camera, a laptop, notebook, or tablet computer, a camcorder, a mobile electronic device, a server, major appliance (e.g., refrigerator, washing machine) and the like. The electronic device 10 may be any electronic device wherein data is transferred between one electronic device to another electronic device.

Generally, the optical connection 20 comprises a lens block 24 having a optical interface portion 25 and a lens surface 27, and at least one magnetic coupling portion 22 comprising a plurality of magnetic regions 23. The lens block 24 is made of an optically transmissive material that allows optical signals to propagate therethrough. The optical interface portion 25, which is configured to receive an optical interface portion of a mated connector of a fiber optic cable assembly, is surface accessible. As used herein, the phrase "surface accessible" means that the surface is substantially free from structure such that it may be easily wiped clean of liquid and debris by a user. In some embodiments, the optical interface portion 25 is substantially planar with respect to the major surface 12 of the electronic device 10. In other embodiments, the optical interface portion 25 may be offset with respect to the major surface 12.

Figure 2:
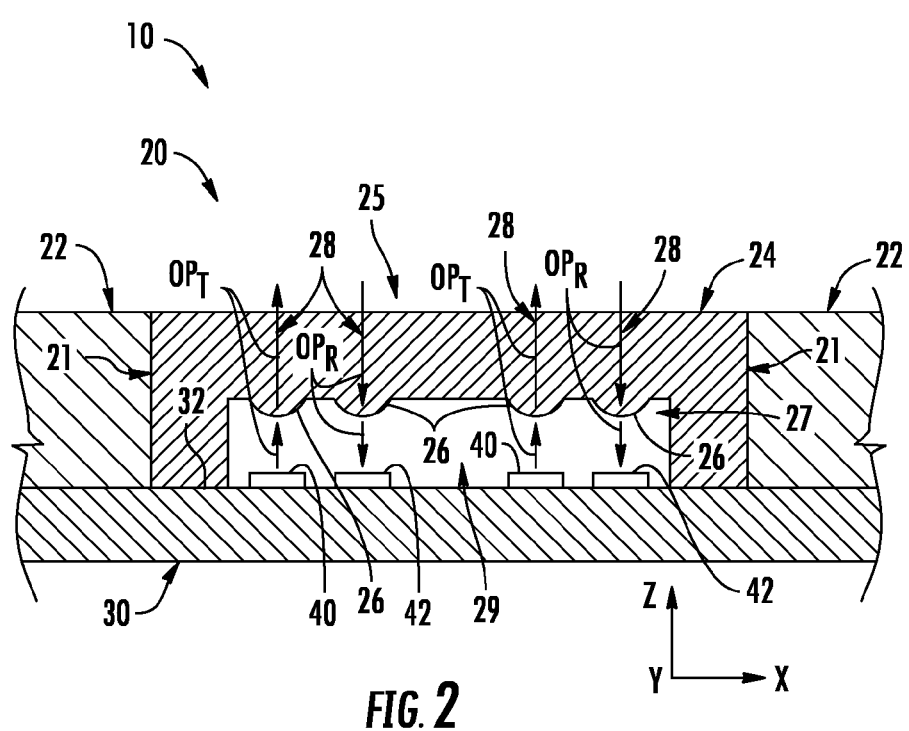
FIG. 2 is a cross-section view of the optical connection depicted in FIG. 1.

Referring now to FIG. 2, the lens block 24 comprises a lens surface 27 that includes one or more lens elements 26, which may be configured as refractive or covered refractive lenses, for example. In other embodiments, the lens elements 26 may be configured as gradient-index (GRIN) lenses. It should be understood that any number of lens elements 26 may be provided. In the illustrated embodiment, the lens elements 26 are integral on the lens surface 27 surface of the lens block 24. For example, the lens block 24 and its features (including the lens elements 26) may be fabricated by precision molding.

The lens block 24 is mechanically coupled to the surface 32 of a substrate, such as a circuit board 30. Also disposed on the surface 32 of the circuit board 30 are active components 40, 42 used for optical communication. The circuit board 30 and the lens block 24 define an enclosure 29 in which the active components 40, 42 are positioned. The active components may be configured as a transmitting active component 40 such as a laser diode (e.g., vertical-cavity, surface-emitting laser ("VCSEL"), distributed Bragg reflector laser, Fabry-Perot laser, etc.) or a receiving active component 42, such as a photodiode.

The lens block 24 is coupled to the surface 32 of the circuit board 30 such that the lens elements 26 are aligned with the active components 40, 42 in the x-, y-, and z-directions. In the illustrated embodiment, the lens block 24 is attached to circuit board 30 by an integral mounting structure 21 configured as individual legs of the lens block 24.

As shown in FIG. 2, the lens block 24 provides optical channels 28 defining both transmitting in-line optical paths ($OP_T$) and receiving in-line optical paths ($OP_R$). Such in-line optical paths allow for the optical interface portion 25 of the lens block 24 to be disposed on a major surface of an electronic device. The lens block 24 may pass optical signals to and from a mated fiber optic cable assembly (not shown in FIGS. 1 and 2 but described below). Accordingly, the lens block 24 provides for an in-line optical path that is generally normal to the circuit board 30 (i.e., no optical turn in the device) and exits on a major surface 12 of the electronic device 10. In other embodiments, the optical connection could provide for in-line optical paths with a shallow angle, such as thirty degrees or less.

Referring to both FIGS. 1 and 2, the magnetic coupling portion 22 is disposed about the lens block 24. Although the magnetic coupling portion 22 is depicted as a single component that completely surrounds the lens block 24, embodiments are not limited thereto. For example, one or more magnetic coupling portions 22 may completely or only partially surround the lens block 24. Additionally, in alternative embodiments, the magnetic coupling portion 22 may not contact the lens block 24 but be offset from the lens block 24 by other material or components.

As described below, the magnetic coupling portion 22 provides fine alignment between optical channels of mated optical connections (i.e., an optical connection of a cable assembly and the optical connection 20 of the electronic device 10 depicted in FIGS. 1 and 2). The optical channel(s) 28 of the optical connection 20 need to be appropriately aligned for transferring the optical signal(s) across the lens surface 27 (i.e., from a cable assembly to a device and vice versa) with an appropriate coupling loss. By way of example, the alignment of axis of the optical signals between the optical interface portions of a fiber optic cable assembly and the electronic device provides an axis offset of 40 microns or less, and may be 20 microns or less, and may even have an axis offset of 10 microns or less for providing a suitable coupling loss such as 1 dB or less, but other suitable values are possible.

The magnetic coupling portion 22 may use one or more coded magnetic arrays or conventional magnets as desired. The selection of the coded magnetic arrays or conventional magnets may depend on the specific design used and desired alignment tolerance required for the application.

Referring to FIG. 1, coded magnetic arrays are coded in the sense that the polarity of each magnetic region 23 is in accordance with a magnetic coding pattern such that a first coded magnetic array may only mate with a corresponding coded magnetic array having a magnetic coding pattern that is opposite from the magnetic coding pattern of the first coded magnetic array. Simply stated, the polarization (specific pattern of north or south poles) of the individual magnetic regions 23 (i.e., magnetic pixels) of the coded magnetic array on the optical connection of the device are magnetically attracted to the polarization of the individual magnetic regions of the complementary magnetic code array disposed on the fiber optic cable assembly since respective magnetic regions have a pattern with the opposite polarities. Moreover, it is the plurality of individual magnetic regions 23 that allow the precise alignment (e.g., tighter alignment tolerance) since they reduce the variance in offset when mating (i.e., coupling of the optical interface portions) due to the nature of the array. Although, the magnetic regions 23 or "pixels" of the array are represented as square they can have any suitable size, shape or the like.

Generally speaking, the coded magnetic array can provide finer alignment control than conventional magnets. Moreover, the coded magnetic arrays can be written onto the blank magnetic material before, during or after assembly (in situ) of the optical connection 20 into the circuit board or device as desired, thereby providing manufacturing flexibility and further process control (between the optical channels of the lens block 24 and the magnetic coupling portion 22). In other words, the registration between optical channels 28 of the optical connection 20 and the magnetic coupling portion 22 can impact the alignment of the axis of the optical signals.

Illustratively, coded magnetic arrays may be magnetized (i.e., "written" with the desired magnetic profile/pixels) onto the magnetic material after final assembly, thereby avoiding having to make separate, very accurate magnets that are then precision aligned to the optical channels during assembly. Simply stated, coded magnetic arrays may be written onto the magnetic material defining the magnetic coupling portion 22 with the desired magnetic coding pattern using the optical channels as the reference which will not move relative to the writing of the magnetic array since the optical channels 28 and magnetic coupling portion 22 are fixed relative to each other. As described below, the magnetic coupling portion may be written on the magnetic material using an in-situ writing process using one or more features of the lens block 24.

Coded magnetic arrays may be advantageous since the use of many individual magnetic regions may allow for random alignment errors of a single magnet-to-magnet coupling relationship to cancel out. The coded magnetic arrays described herein may allow for optical couplings to self-align with respect to one another to the desired tolerance required for repeatable mating of the optical connection.

Use of such coded magnetic arrays for the magnetic coupling portion 22 may also be useful for a liquid displacing optical interface portion 25 (i.e., the generally flat coupling face provides a low-profile and sleek design and provides easy cleaning). Consequently, conventional magnets should not be confused with coded magnetic arrays; moreover, the coded magnets may allow for smaller tolerance for alignment and coupling compared with conventional magnets.

On the other hand, the magnetic coupling portion(s) may be configured as individual conventional magnets. The conventional magnetic regions may be configured as individual magnets that are provided in a molded magnet holder or the like that is disposed about the optical module or lens block. However, using conventional magnets may not be as robust as the coded magnetic arrays.

The concepts disclosed herein are simple and easy to manufacture. Moreover, the concepts disclosed herein may be used with connecting the electronic device to a fiber optic cable assembly, a docking station, and the like. The lens block 24 may use any suitable lens elements 26, such as a covered refractive lens design, GRIN lenses or other suitable optical interface portion. However, the designs illustrated herein use a lens block on the device side and an optical module that turns the optical signal on the cable assembly.

Additionally, the optical interface portion 25 may use an optional coating and/or glass cover interface to provide a robust and cleanable surface that protects internal components. The coating or glass cover may be coated to reduce friction and possibly reduce reflection related losses as well. Likewise, the optical interface portion 25 surface(s) may have a small angle relative to the normal direction to help reduce the impact of reflection, such as in the range of 1-3 degrees. However, other small angles may be possible with still being considered generally normal to the circuit board for in-line optical path for the device.

Figure 3:
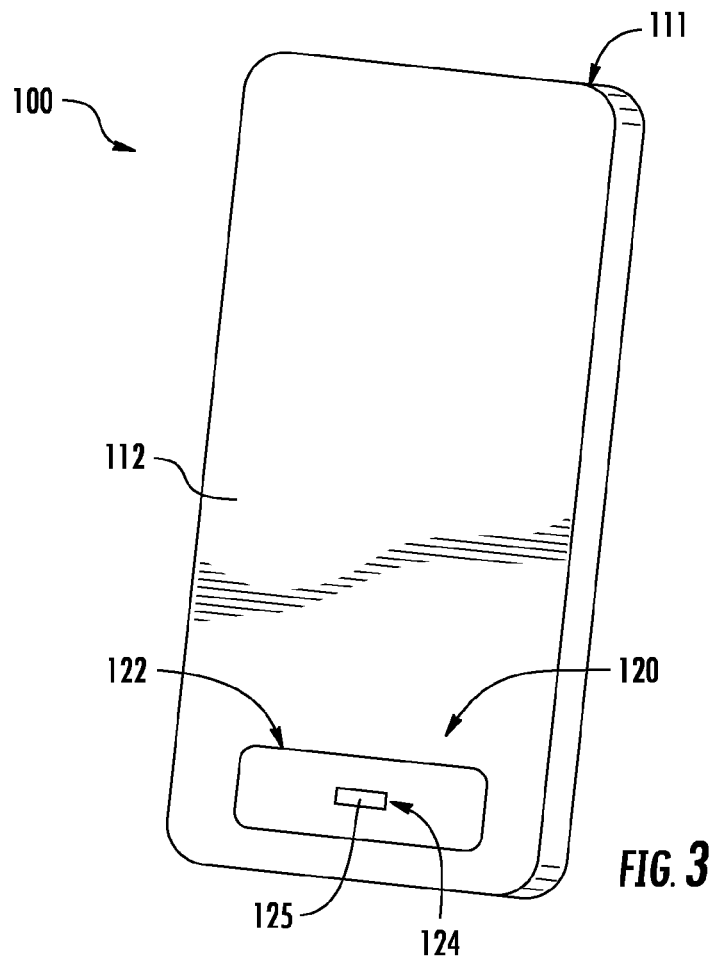
FIG. 3 depicts an optical connection positioned on backside major surface of an electronic device according to one or more embodiments of the disclosure.

The optical connections described herein may be incorporated into any electronic device. Referring now to FIG. 3, an electronic device 100 configured as a smart phone includes an example optical connection 120 disposed in a major surface 112 of a housing 111 (e.g., a backside surface of a smart phone). The illustrated optical connection 120 includes a lens block 124 having an optical interface portion 125, and a magnetic coupling portion 122. It should be understood that embodiments of the present disclosure are not limited to the location and geometric configuration of the optical connection 120 depicted in FIG. 3. For example, in alternative embodiments, the optical connection 120 may be disposed in the middle of the major surface 112, or the magnetic coupling portion 122 may be configured as circular rather than rectangular as depicted in FIG. 3.

Figure 4:
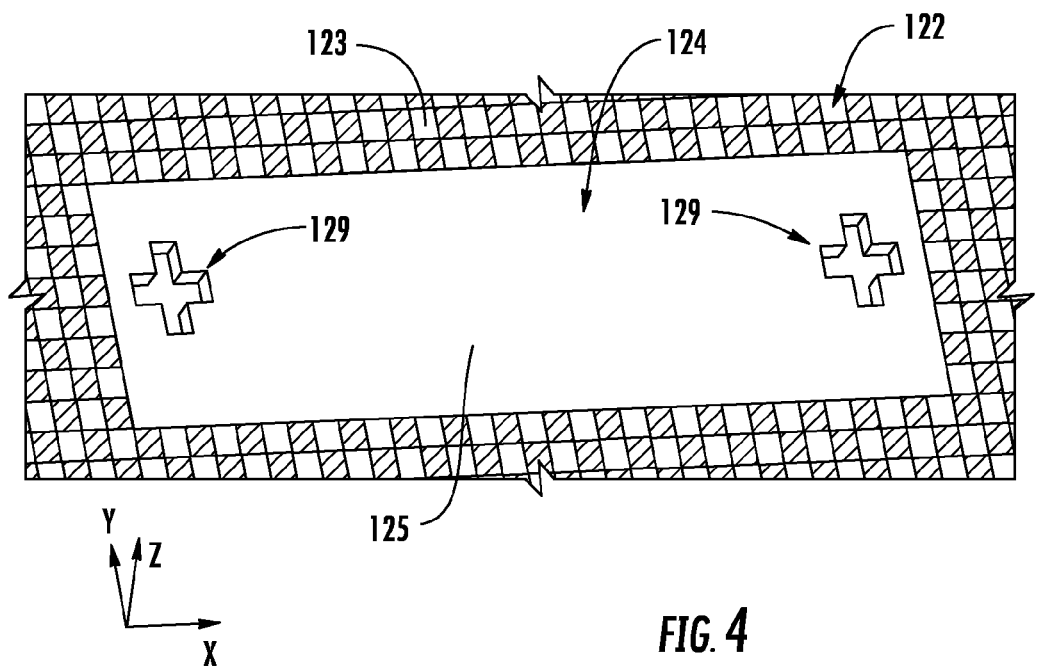
FIG. 4 is a close-up, partial view of the optical connection depicted in FIG. 3.

FIG. 4 is a close-up view of the optical interface portion 125 of the optical connection 120 depicted in FIG. 3. The optical interface portion 125 is provided in a lens block 124 and is configured for mating with a complimentary optical connection. The magnetic coupling portion 122 of the optical connection 120 may be configured as a coded magnetic array or as individual magnets as described above. In the illustrated embodiment, the magnetic coupling portion 122 is configured as a coded magnetic array defined by magnetic regions 123 or pixels having a magnetization state (i.e., "north" or "south") according to a magnetic coding pattern. Although the magnetic coding pattern is depicted in a checkerboard pattern for illustrating the concept, embodiments are not limited thereto. Any magnetic coding pattern may be utilized. As described above with respect to the embodiment depicted in FIGS. 1 and 2, the magnetic coupling portion 122 provides fine alignment of the optical channels 128 and the active components 140, 142.

The illustrated optical connection 120 further includes two alignment fiducials 129 disposed on the lens block 124 adjacent to the optical interface portion 125. It should be understood that more or fewer than two alignment fiducials may be provided, and that, in some embodiments, no alignment fiducials may be present. The alignment fiducial(s) 129 provides alignment along two directions, such as in the X and Y reference directions, and allows the magnetic coupling portion 122 to perform the fine optical axis alignment as well as provide a retention force for coupling the two complementary optical interface portions (e.g., the optical interface portion 125 of the illustrated optical connection 120 and an optical interface portion of a fiber optic cable assembly). For instance, the alignment fiducial(s) 129 may be a cross-shaped recess cavity allowing fine movement in two directions. On the device side, the alignment fiducial(s) is preferably a recessed cavity, thereby providing a generally flush surface for the device, but it could be a male alignment fiducial if desired and the complementary optical connection of a cable assembly or the like could have the female alignment fiducial(s).

Figure 5A:
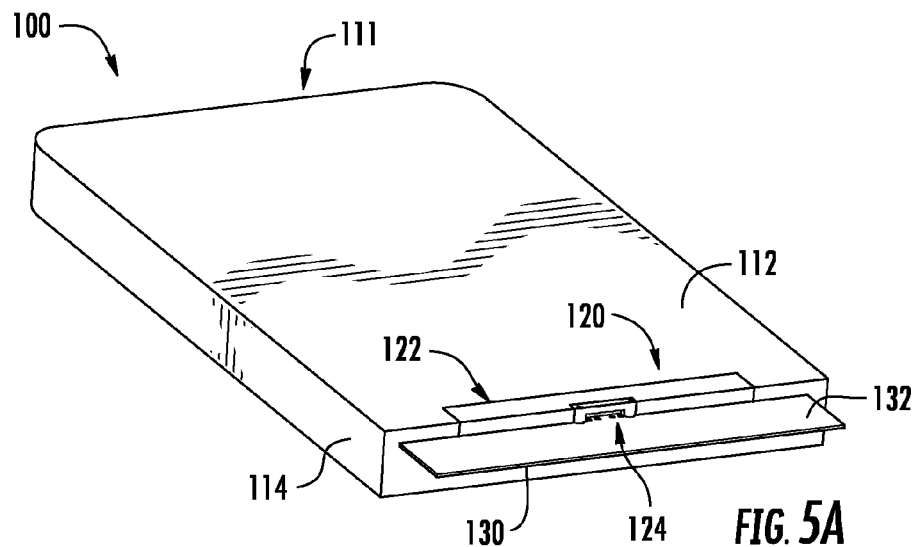
FIG. 5A is a cutaway view of the electronic device depicted in FIG. 3.
Figure 5B:
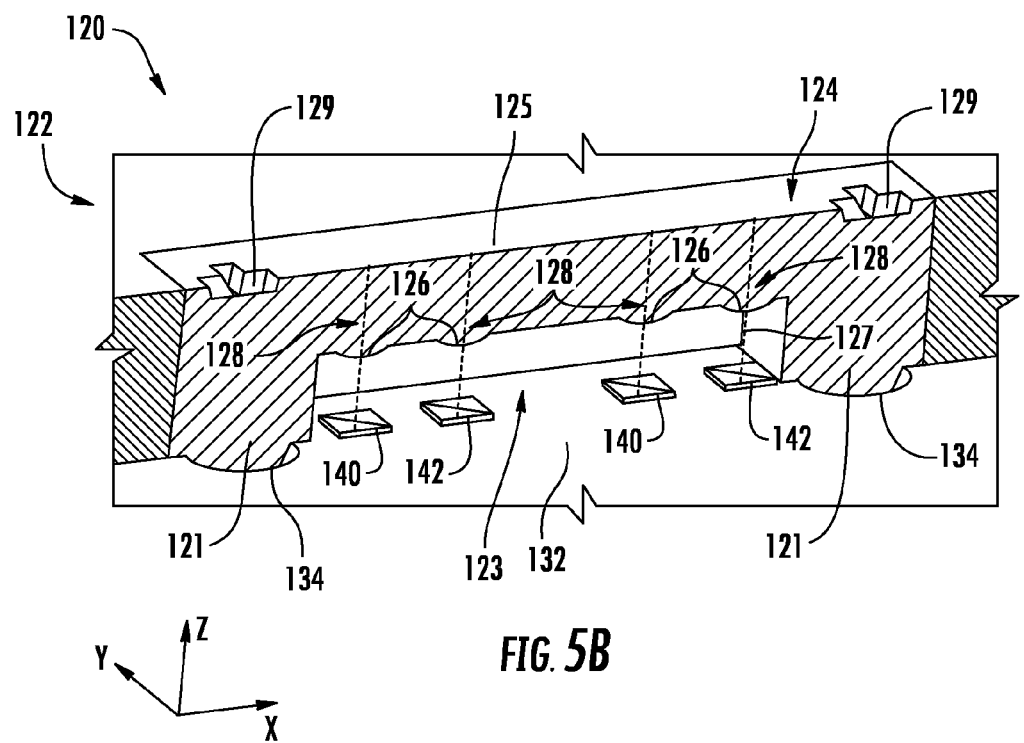
FIG. 5B is a close-up, cutaway view of the optical connection of the electronic device depicted in FIG. 5A.

Referring now to FIGS. 5A and 5B, cutaway views of the optical connection 120 of the electronic device depicted in FIGS. 3 and 4 are depicted. FIG. 5A is a cutaway view of the electronic device 100, while FIG. 5B is a close-up, cutaway view of the optical connection 120 of the electronic device 100 depicted in FIG. 5A. As shown in FIG. 5B, the lens block 124 has a first and second alignment fiducials 129 disposed on opposite sides of a plurality of optical channels 128 of the lens block. The optical channels 128 are defined by the lens elements 126 provided on a lens surface 127, which may be opposite from a surface of the optical interface portion 125.

The lens block 124 may be attached to a circuit board 130 (or other substrate) using mounting structure 121 integrally formed in the lens block 124, for example. As coupled to the surface 132 of the circuit board 130 are active components 140, 142 such as laser diodes (e.g., active components 140) and photo diodes (e.g., active components 142) for the transmission and receipt of optical signals, respectively. As an example and not a limitation, the mounting structure 121 or structures of the lens block 124 may be positioned within features (e.g., recesses 134) on the surface 132 of the circuit board 130. The features may also be configured as markings on the surface 132 of the circuit board 130 that are used as alignment fiducials to properly locate the lens block 124. The lens block 124 may be adhered to the circuit board 130 by the use of an appropriate adhesive. Then, the circuit board 130 may be used as a component of the electronic device 100. The optical connection 120 can be formed as a complete assembly that is attached to the circuit board 130 or constructed onto the circuit board 130 as desired.

The lens block 124 should be secured to the circuit board 130 such that the optical channels 128 of the lens block 124 are aligned with the active components 140, 142 in the X and Y directions to minimize optical coupling loss and ensure that the optical signals propagate through the lens block 124 both to and from the active components 140, 142. The alignment of the lens block 124 to circuit board 130 and secure coupling therebetween should be robust because forces may act directly on the lens block 124, which may impact optical alignment with the active components 140, 142 and therefore impact optical performance. In other words, the lens elements 126 that are formed in the lens surface 127 of the lens block 124 (i.e., lower surface) should be aligned with the active components 140, 142, such as VCSELs and photodiodes, for transmitting/receiving optical signals.

The magnetic coupling portion 122, which is configured as a coded magnetic array in the illustrated embodiment, is disposed about the lens block 124 and may also be coupled to the surface 132 of the circuit board 130. Although the magnetic coupling portion 122 is illustrated as a single region that surrounds the lens block 124, embodiments are not limited thereto. For example, several individual and non-continuous magnetic coupling portions 122 may be provided about the lens block 124. The area of the magnetic coupling portion 122 should be large enough to ensure retention between the optical connection 120 and a mated optical connection of a mated device, such as a fiber optic cable assembly (see FIGS. 6A, 6B and 7). Generally, the major surface 112 of the electronic device 100 provides a large area for the magnetic coupling portion 122. As an example and not a limitation, the magnetic coupling portion 122 may have an area that is greater than about 50 square millimeters ($mm^2$) to prevent external angular forces from undesirably decoupling the mated optical connections.

The optical connection 120 can be formed as a complete assembly that is attached to the circuit board 130, or constructed onto the circuit board 130 as desired. In embodiments, the optical connection 120 may be isolated from the housing 111 of the electronic device 100 such as mounted on the circuit board 130 or the like, thereby inhibiting misalignment effects from the housing 111. In other embodiments, all or a portion of the optical interface portion 125 may be disposed on the housing 111 of the electronic device 100 as desired. If disposed on a portion of the housing 111, the magnetic material of the magnetic coupling portion 122 may be demagnetized, installed, and again magnetized (i.e., written) relative to the alignment fiducials or other features if needed. In further embodiments, the magnetic material may be on the same component that houses the lens block 124 so the optical connection 120 can be placed onto the circuit board 130 or the like as a complete assembly. An optional metallic shield (not shown, see FIGS. 10 and 11) may be disposed between the circuit board 130 and the magnetic coupling portion 122 of the optical connection 120 as desired for any of the embodiments described herein. The metallic shield may be provided to reduce magnetic field effects for the magnetic coupling portion 122 on the internal components of the circuit board 130 and or electronic device 100.

As shown in FIG. 5B, the optical connection 120 is positioned on or within the electronic device 100 to have an in-line optical path(s) that is generally normal to the surface 132 of the circuit board 130 of the electronic device 100 (i.e., no optical turn of optical signals is present in the electronic device 100). Optical signals propagating along the in-line optical path enter and exit a major surface 112 of the device. In other words, the optical axis of the optical connection 120 is generally normal to the circuit board 130 and generally aligned with a minor surface 114 (i.e., the thin edge) of the electronic device 100, and exits on the large, major surface 112 face of the electronic device 100 on a generally straight path without an optical turn. In other embodiments, the optical connection 120 may provide an in-line optical path with a shallow angle (e.g., thirty degrees or less), if desired. This provides a simple, robust and cost-effective optical connection for the electronic device 100.

Figure 6A:
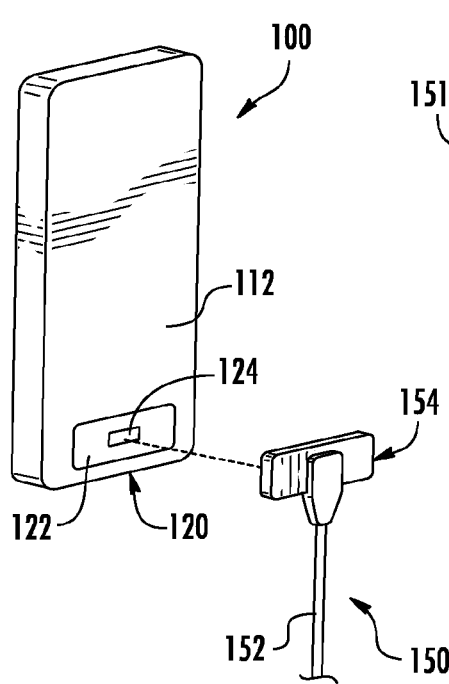
FIG. 6A depicts an exemplary fiber optic cable assembly decoupled from the electronic device depicted in FIG. 3 according to one or more embodiments of the disclosure.
Figure 6B:
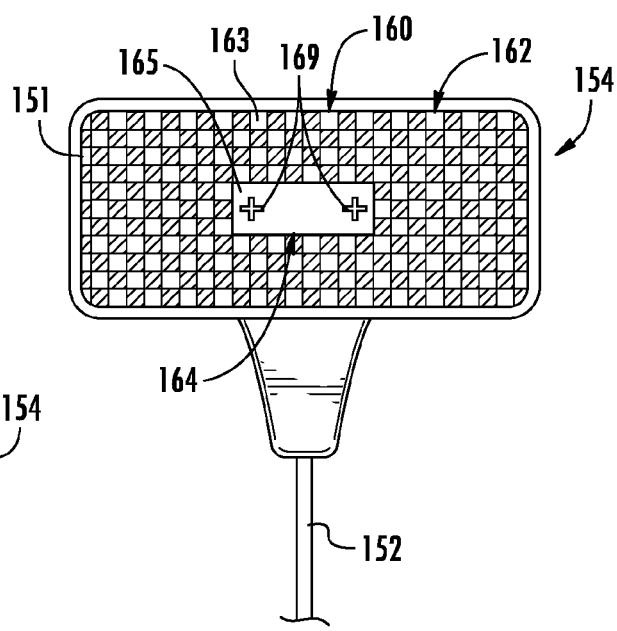
FIG. 6B is a front view of an optical connection of the fiber optic cable assembly depicted in FIG. 6A according to one or more embodiments of the disclosure.
Figure 6C:
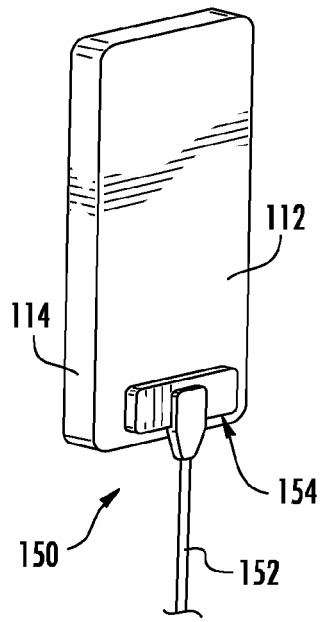
FIG. 6C depicts the fiber optic cable assembly and the electronic device of FIG. 6A in a coupled relationship.

Referring now to FIGS. 6A-6C, embodiments of the present disclosure are also directed to a fiber optic cable assembly 150 for mating with the device optical connection 120 described above. FIG. 6A depicts a fiber optic cable assembly 150 that is decoupled from an electronic device 100 having a device optical connection 120. FIG. 6B is a front view of a mating surface 151 of the fiber optic cable assembly 150 depicted in FIG. 6A. FIG. 6B depicts the fiber optic cable assembly 150 magnetically coupled to the electronic device 100.

The fiber optic cable assembly 150 includes a fiber optic cable 152 having a plurality of optical fibers (not shown in FIGS. 6A-6C), a cable optical connection 160 comprising an optical module 164 having an optical interface portion 165, and a magnetic coupling portion 162. The cable optical connection 160 is disposed within a mating surface 151 of a connector body 154 of the fiber optic cable assembly 150. The plurality of optical fibers terminates within the connector body, as described in more detail below. The optical interface portion 165 has a surface that may be substantially planar with respect to the mating surface 151 of the connector body 154, in some embodiments.

The illustrated cable optical connection 160 includes a first and second alignment fiducial 169 (e.g., a male cross-shaped alignment fiducial for mating with the alignment fiducial 129 of the device-side optical connection 120). The first and second alignment fiducials 169 are disposed on opposite sides of a plurality of optical channels 168 of the optical interface portion 165. It should be understood that no alignment fiducials may be included in alternative embodiments. The first and second male alignment fiducials 169 may provide alignment along two directions when coupled to the corresponding first and second female alignment fiducials 129 of the device optical connection.

Referring specifically to FIG. 6B, the magnetic coupling portion 162 surrounds the optical module 164 and is configured to magnetically mate with the magnetic coupling portion 122 of the optical connection 120 of the electronic device 100 described above. Accordingly, the magnetic coupling portion 162 includes an array of magnetic regions 163 that are magnetized according to a magnetic coding pattern that is opposite from a magnetic coding pattern of the magnetic coupling portion 122 of the device optical connection 120. When the corresponding alignment fiducials 129, 169 are placed within proximity to each other (i.e., in a mated relationship), the individual magnetic regions 123, 163 are magnetically attracted to each other and thereby align the optical interface portion 125 of the device optical connection 120 with the optical interface portion 165 of cable optical connection 160. More specifically, the magnetic coupling portions 122, 162 provide fine alignment between optical channels of the device and cable optical connections 120, 160.

As shown in FIG. 6C, the magnetic attraction between the magnetic coupling portion 122 of the electronic device 100 and the magnetic coupling portion 162 of the fiber optic cable assembly 150 retain the two components in a mated relationship. The size and configuration of the magnetic coupling portions 122, 162 should be such that the mated relationship between the electronic device 100 and the fiber optic cable assembly 150 is resistant to inadvertent angular forces that may decouple the two devices, such as accidental pulling on the fiber optic cable 152.

Figure 7:
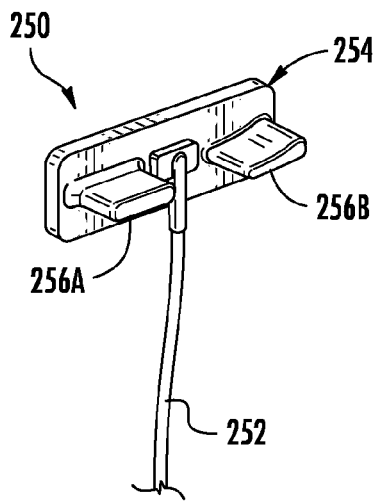
FIG. 7 depicts another fiber optic cable assembly having protrusion features for decoupling the fiber optic cable assembly from an electronic device.

FIG. 7 depicts another embodiment of a fiber optic cable assembly 250 that includes a fiber optic cable 252 terminating at a connector body 254 having two protruding features 256A and 256B. The protruding features 256A and 256B of the illustrated embodiments are configured to enable a user to twist off the fiber optic cable assembly 250 from a mated electronic device. The protruding features 256A, 256B may be shaped to allow a user to grip the protruding features 256A, 256B and then rotate the connector body 254 to disengage the fiber optic cable assembly 250 from the electronic device.

Figure 8:
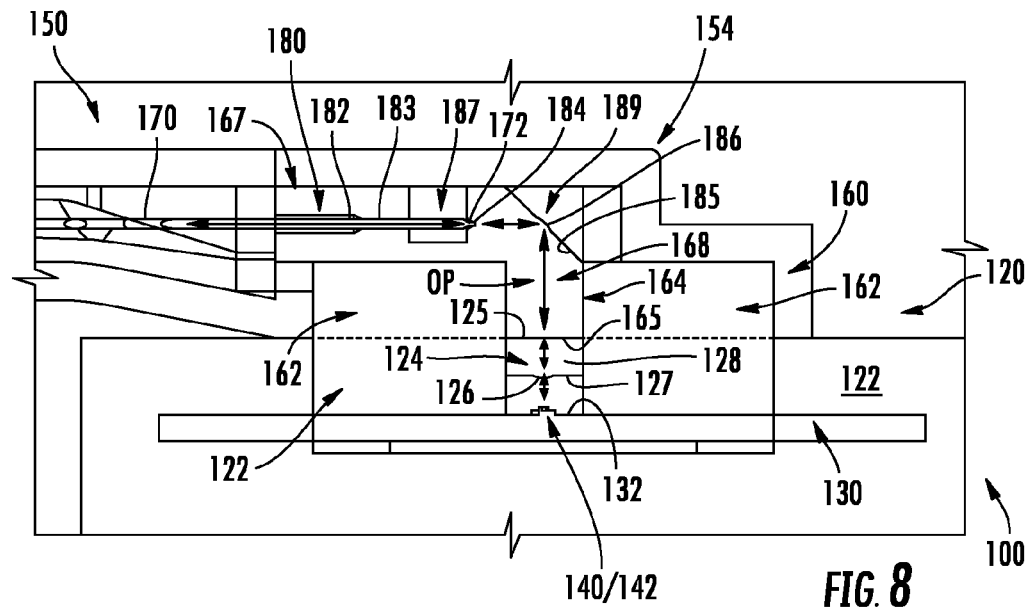
FIG. 8 is a cross-section view of a cable optical connection coupled to a device optical connection according to one or more embodiments of the disclosure.
Figure 9:
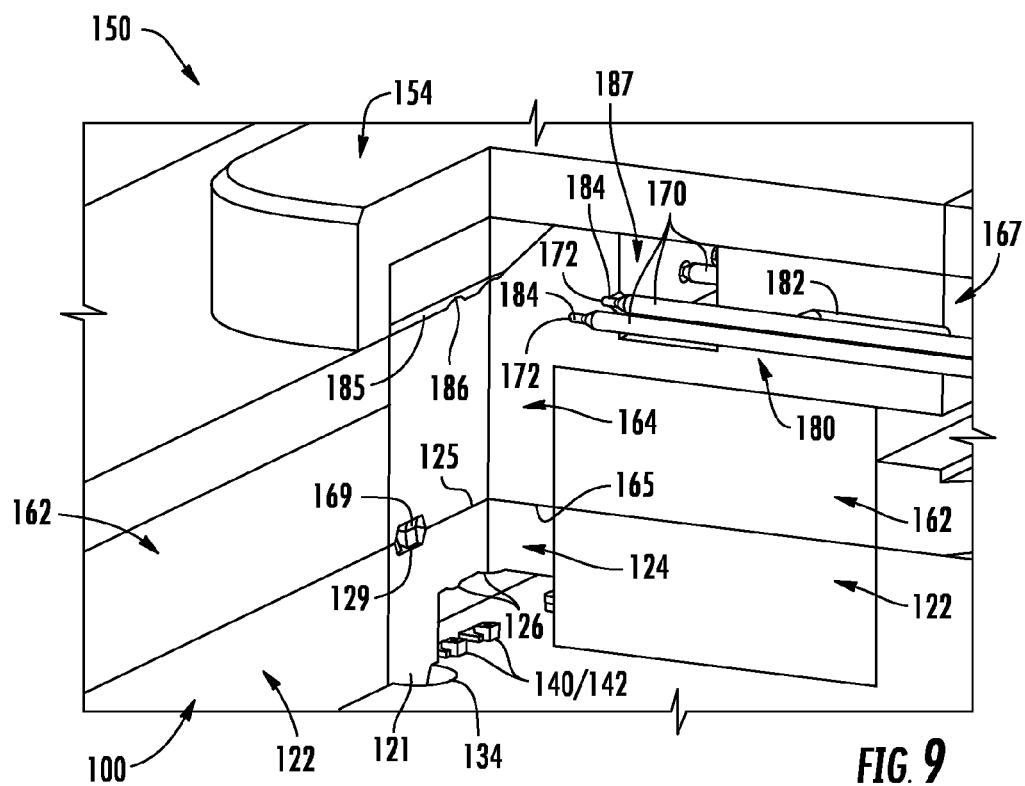
FIG. 9 is a two-axis cross-section view of a cable optical connection coupled to a device optical connection.

FIG. 8 schematically depicts a cross-section view of the cable optical connection 160 depicted in FIG. 6B coupled to the device optical connection 120 depicted in FIGS. 3-5B. FIG. 9 is a two-axis cross-section schematic view showing the cable optical connection 160 mated to the device optical connection 120 for making an optical connection therebetween. The optical module 164 includes a fiber receiving portion 167 that includes a plurality of fiber guides 180 for receiving and securing the optical fibers 170 of the fiber optic cable 152. In some embodiments, each of the fiber guides 180 may include several segments, such as a first segment 182, a second segment 183, and a third lead-in feature segment 184. The first segment 182 may have a larger diameter than the other segments to enable easy insertion of the optical fibers 170 into the fiber receiving portion 167. The diameter of the first segment 182 may taper to a smaller diameter second segment 183 that substantially matches the diameter of the optical fiber 170 to maintain the optical fiber 170 within the optical module 164.

The exemplary optical module 164 also includes a well 187 disposed between the fiber receiving portion 167 and the optical interface portion 165. The optical fibers 170 extend across the well 187 such that a fiber end 172 of the optical fibers is positioned within the lean-in feature segment 184. The lead-in feature segment 184 is used for aligning and seating the fiber end 172 of the optical fiber 170 within the optical module 164. An appropriate adhesive, such as a UV curable adhesive or the like, may be applied to the well to secure the inserted optical fibers 170 to the optical module 164.

The optical module 164 includes a total-internal-reflective (TIR) surface 185 that reflects and redirects optical signals propagating along a turned optical path OP, as indicated by the arrows. An air gap 189 between the optical module 164 and the connector body 154 or another component provides an index of refraction difference that causes the optical signals to be reflected by total internal reflection. The optical paths OP are present within optical channels 168 of the optical module 164. Accordingly, the optical module 164 turns the optical signal to/from the optical fibers 170 to/from the optical interface portion 165. The optical module 164 may be fabricated from a material that is transmissive to wavelengths of the optical signals propagating therethrough. In some embodiments, the TIR surface 185 includes lens elements 186 that condition (i.e., focus) the optical signal to be received by the optical fibers 170 or the active components 140, 142.

As shown in FIGS. 8 and 9, the magnetic coupling portion 122 of the device optical connection 120 is magnetically coupled to the magnetic coupling portion 162 of the cable optical connection 160. Further, the first and second male alignment fiducials 169 of the cable optical connection 160 are disposed within the first and second female alignment fiducials 129 of the device optical connection 120 (see FIG. 9). As described above, the male alignment fiducial 169 is a complementary cross-shaped protrusion on the optical module 164 for gross alignment of the optical module with the lens block and is slightly smaller that the female alignment fiducial 129 on the lens block 124 for allowing alignment along two directions.

The respective optical interface portions 125, 165 of the electronic device 100 and the fiber optic cable assembly 150 are aligned and held together by the respective magnetic coupling portions 122, 162. A small gap or profiling between the respective optical interface portions 125, 165 may be desirable to inhibit scratching and like from dirt or debris. In other embodiments, the respective optical interface portions 125, 165 may contact one another. A portion of the device optical connection 120 and/or the cable optical connection 160 may include a coating and/or glass cover for protecting surfaces and/or providing a low friction surface.

As shown in FIG. 8, optical signals follow optical path OP such that they exit the optical fibers 170, are turned by the TIR surface 185, pass through the optical interface portions 125, 165, are focused by the lens elements 126, and are received by the active components 142 (i.e., photodiodes). Similarly, optical signals are emitted by active components 140 (i.e., laser diodes), focused by the lens elements 126, pass through the optical interface portions 125, 165, turned by the TIR surface 185, and received by the optical fibers 170. The resulting design is a simple, robust and cleanable optical connection and fiber optic cable assembly may be employed on many small or large devices such as cell phones, tablets, laptops, TV, refrigerators and the like that have planar surfaces.

Figure 10A:
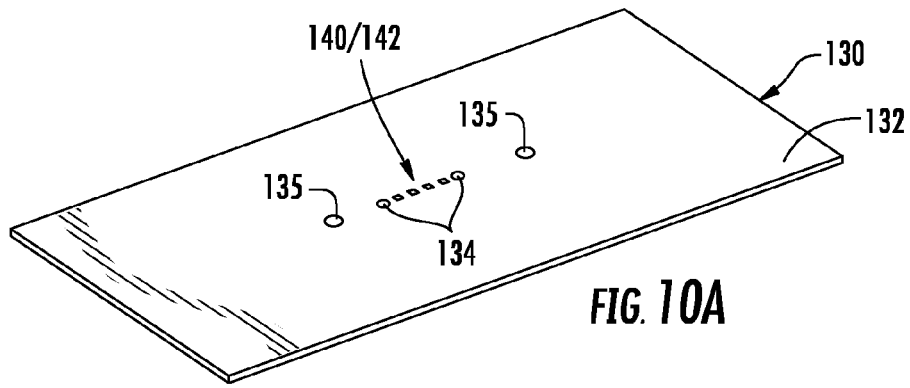
FIGS. 10A-10D depict a process of fabricating an optical connection according to one or more embodiments of the disclosure.
Figure 10B:
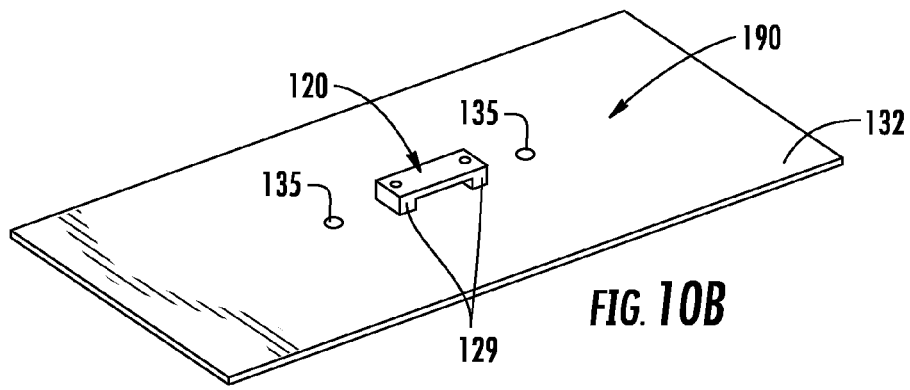

Referring now to FIGS. 10A-10D, an exemplary process for fabricating a device optical connection 120 will now be described. Aspects of the exemplary process described below are also applicable to fabricating a cable optical connection 160. Referring first to FIG. 10A, a circuit board 130 having one or more active components 140, 142 attached to a surface 132 is provided. The one or more active components 140, 142 may be located on the surface 132 of the circuit board 130 with reference to one or more alignment fiducials. The circuit board 130 may also include features or recesses 134 for receiving the lens block 124. As shown in FIG. 10B, a lens block 124 is placed on the circuit board 130. The mounting structures 121 of the lens block 124 are positioned in the recesses 134 of the circuit board and secured with an adhesive. The lens block 124 is precisely aligned with the active components 140, 142. When placing the lens block 124 on the circuit board 130, the lens elements 126 may be used as reference fiducials to align the lens block 124 to the active components 140, 142. In other embodiments, other fiducials may be provided on the lens block 124 for alignment. Further, in some embodiments, fiducials located on the circuit board 130 may be used for alignment rather than the active components 140, 142 themselves. Generally speaking, the optical interface portion is precisely aligned with the active component for providing a suitable optical coupling efficiency.

Figure 10C:
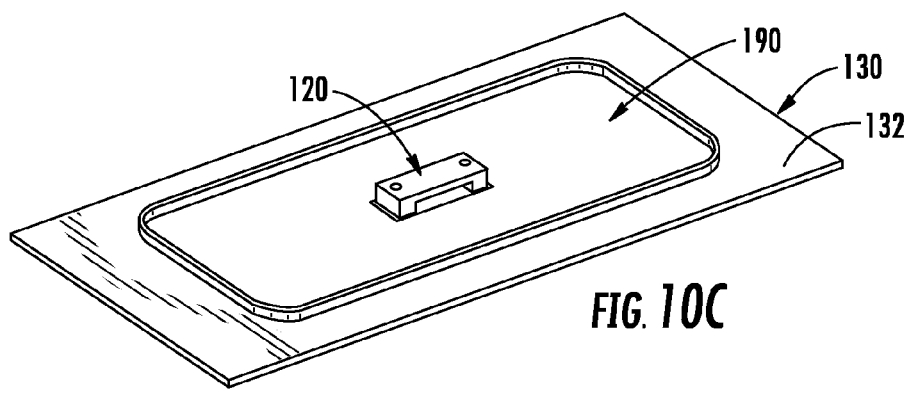

Referring now to FIG. 10C, an optional metallic shield 190 may be placed about the lens block 124 to shield other components within the electronic device from magnetic fields generated by the magnetic coupling portion 122. The metallic shield 190 may be shaped to receive the bulk magnetic material of the magnetic coupling portion 122. The metallic shield 190 may be attached via openings 135 in the circuit board 130, for example.

Figure 10D:
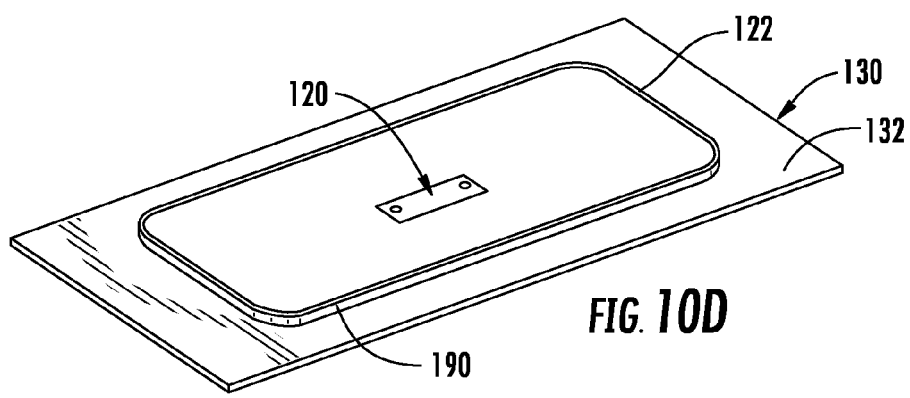

A bulk magnetic material defining the magnetic coupling portion 122 is disposed around the lens block 124, as depicted in FIG. 10D. The bulk magnetic material may be one piece, or multiple pieces to enable optimized lens designs. The bulk magnetic material may be any material capable of being programmed into an array of magnetic regions that define a magnetic coding pattern.

An in situ magnetizing process is one in which the bulk magnetic material is magnetized in precise zones (i.e., desired magnetic regions for the coded magnetic array) in place by referencing the lens block 124, active components 140, 142, and/or electronic device 100 for registration between the optical channels and coded magnetic array of the magnetic coupling portion 122. For example, once the lens block 124 is properly secured to the circuit board 130 and the active components 140, 142 secured thereon, the lens elements 126 may be used as reference points for the writing of the magnetic coding pattern within the bulk magnetic material. The in situ process may advantageously eliminate the need for the assembly of small magnets difficult and time-consuming manufacturing techniques. The lens elements 126 of the lens block 124 or optical module 164 of the fiber optic cable assembly having the optical interface portion may then be aligned such as optically aligned to a device that imparts the coded magnetic properties (the written array) to the bulk magnetic material in a predetermined polarity array. For instance, a vision or actively aligned system may be used to register/align to the optical centers of the optical interface portion before writing the coded magnetic array to the bulk magnetic material.

In some embodiments, an anti-friction coating may be applied to the magnetic coupling portion 122 after magnetization to reduce inadvertent decoupling. Additionally, a cover, such as a glass cover, may also be applied to the lens block 124. Further, anti-reflective coating, oleophobic coating, hydrophobic coating, or other coatings may be applied to the lens block 124 to reduce optical loss of the optical signals.

The optical connections described herein may be employed in a variety of devices, such as fiber optic cable assemblies, electronic devices, and docking stations for electronic devices. As described in more detail below, if the optical connector is incorporated into docking station, the docking station may have one or more optical connections suitable for attaching a device such as a laptop computer, tablet, or cell phone thereto. Moreover, the optical connection may be recessed from a planar major surface of the electronic device as desired so that the electronic device may lay flat with the optical connection on an underside surface of the electronic device. Various electronic devices incorporating the optical connections described herein will now be described. However, it should be understood that embodiments are not limited to the electronic devices described herein, and that other electronic devices may also utilize such optical connections.

Figure 11A:
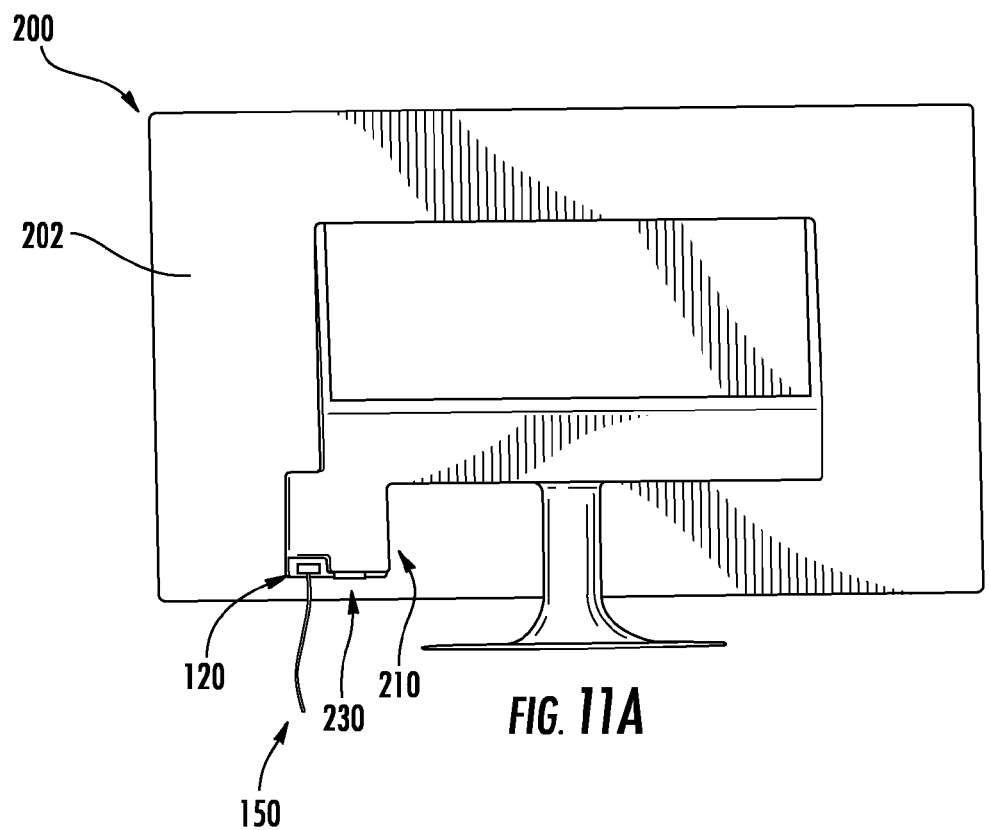
FIG. 11A is a rear view of a display device having an optical connection according to one or more embodiments of the disclosure.
Figure 11B:
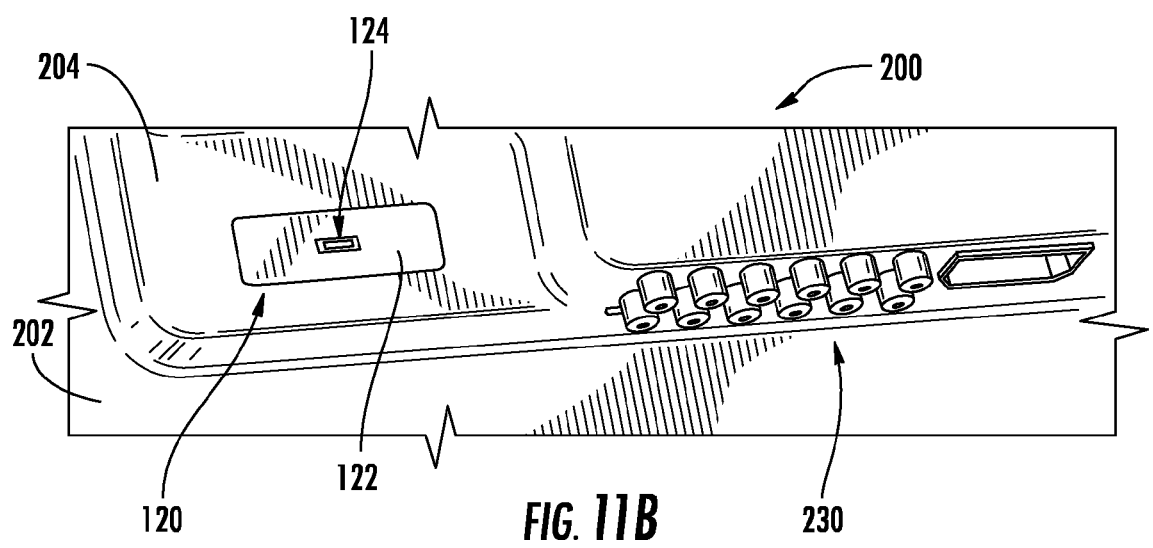
FIG. 11B is a close-up view of the optical connection of the display device depicted in FIG. 11A.

Referring now to FIGS. 11A-11C, a display device 200 including an optical connection 120 disposed in a major surface 202 (i.e., rear surface) is illustrated. The display device 200 may be a computer monitor, a digital picture frame, a flat screen television, and the like. FIG. 11A depicts a rear view of the display device 200, while FIG. 11B depicts a close-up view of the optical connection 120 without a fiber optic cable assembly 150 and FIG. 11C depicts a close-up view of the optical connection 120 with a fiber optic cable assembly 150 coupled thereto. It should be understood that the configuration of the major surface 202 and the placement of the optical connection 120 depicted in FIGS. 11A-11C are for non-limiting, illustrative purposes only, and that other configurations are also possible.

An optical connection 120, such as the optical connection 120 having an in-line optical path described above, is provided on a rear surface 202 of the display device 200. The optical connection 120 may include a lens block 124 and magnetic coupling portion 122 for mating with an optical connection 160 of a fiber optic cable assembly 150 as described above. In the illustrated embodiment, the optical connection 120 is disposed on a connection segment 210 that protrudes from the rear surface 202 of the display device 200. The illustrated connection segment 210 also includes a plurality of electrical video connections, such as component video, VGA, HDMI, and the like. In alternative embodiments, the optical connection 120 may be disposed directly on the rear surface 202 (or other surface) rather than on a connection segment 210. The optical connection 120 is rear-surface accessible, meaning that a user may easily wipe the optical connection 120 clean of liquid and/or debris without being encumbered by mechanical alignment structures.

The optical connection 120 may provide an in-line optical path without an optical turn of optical signals within the lens block 124. Alternatively, the optical connection 120 may include an optical module having a TIR surface, such as the optical module 164 described above with respect to the fiber optic cable assembly 150. In such embodiments, the optical signals within the optical connection 120 will experience a turn before reaching the active components or upon emission by the active components. Accordingly, the optical connection 120 may be configured as having an in-line optical path or a turned optical path.

In embodiments, the optical connection 120 may be isolated from the housing (e.g., rear surface 202 and/or other surfaces) and/or other components of the display device, thereby reducing misalignment effects caused by external forces applied to the housing. The optical connection 120 may or may not include alignment fiducials to aid in the alignment of the fiber optic cable assembly 150 to the optical connection 120 (e.g., the cross-shaped alignment fiducials depicted in FIG. 4).

As shown in FIG. 11C, an exemplary fiber optic cable assembly 150 having a connector body 154, a fiber optic cable 152, and a cable optical connection 160 as described above with reference to FIGS. 6A-6C is magnetically and optically coupled to the optical connection 120 of the display device. The opposite end of the fiber optic cable assembly 150 may be optically coupled to a data source, such as a storage device, a computing device (e.g., a personal computer or a server), a fiber network (e.g., an in-home fiber network coupled to a fiber-based internet service provider), and the like. The optical connection 120 and coupled fiber optic cable assembly 150 may provide high speed, high bandwidth video data to the display device, for example.

Figure 12A:
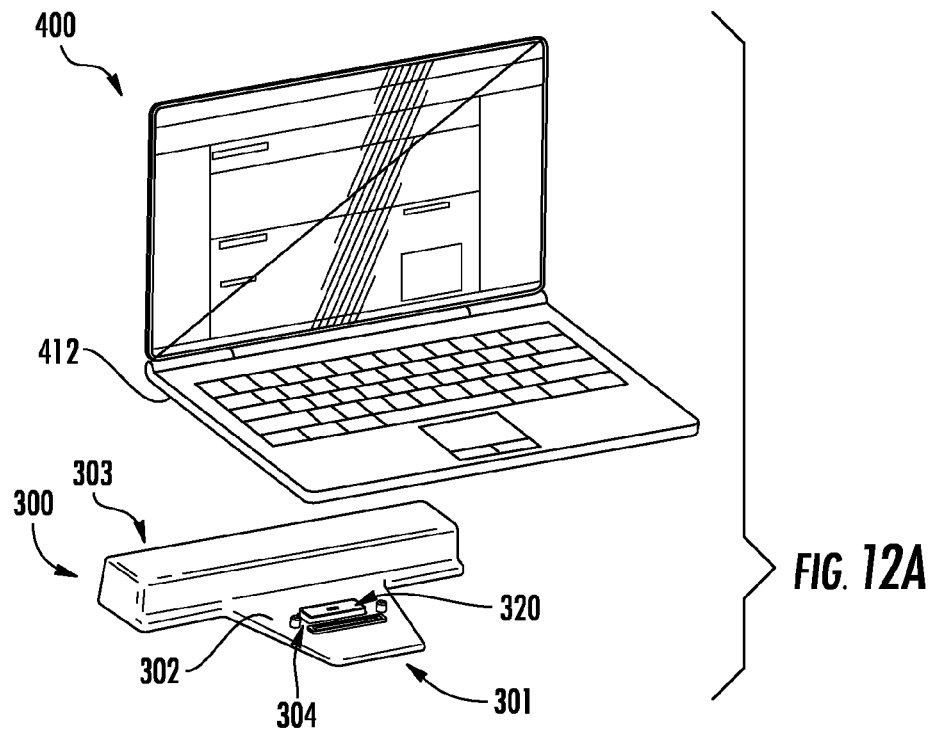
FIG. 12A is a perspective view of an electronic device and a docking station having an optical connection in a decoupled relationship.
Figure 12B:
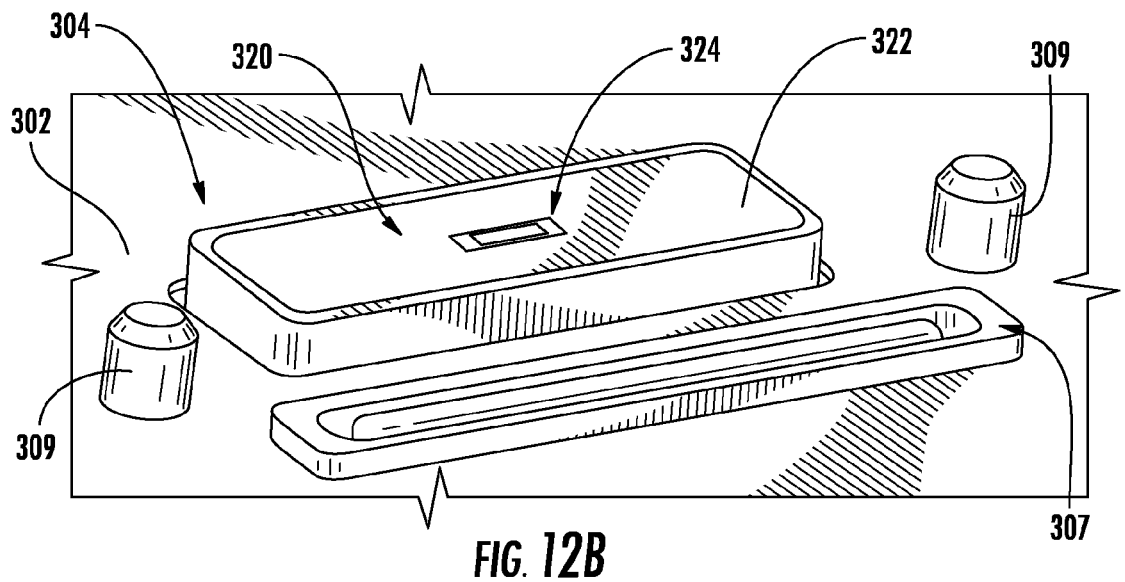
FIG. 12B is a close-up view of the optical connection of the docking station depicted in FIG. 12A.
Figure 12C:
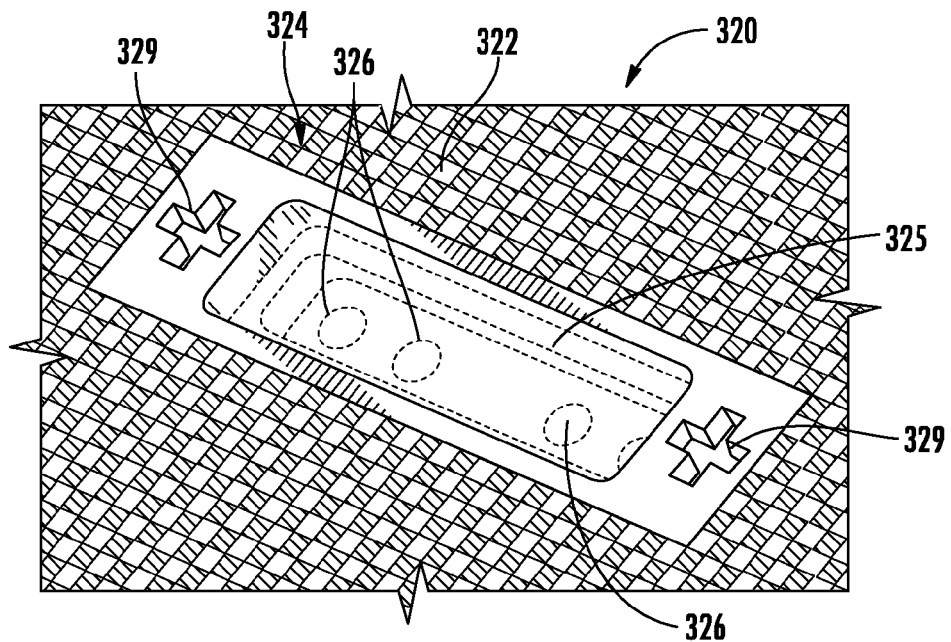
FIG. 12C is a close-up view of the lens module depicted in the optical connection illustrated in FIG. 12B.
Figure 12D:
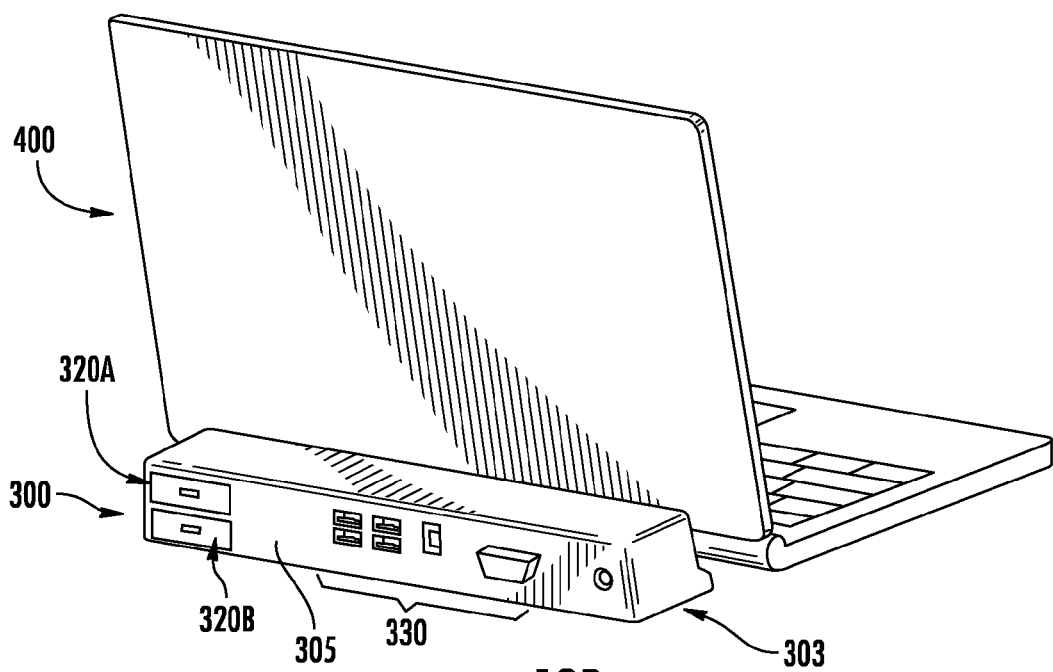
FIG. 12D is a rear perspective view of the electronic device mated to the docking station of FIG. 12A.

The optical connections described herein may also be incorporated into a docking station for mating with an electrical device for providing additional electrical, optical, and/or electro-optical connectors or ports for the coupled electronic device. Referring now to FIGS. 12A-12D, an exemplary docking station 300 for an exemplary electronic device configured as a computer 400 is depicted. It should be understood that the computer may take on any number of configurations. FIG. 12A depicts a computer 400 decoupled from the docking station 300, while FIG. 12B depicts a close-up view of an optical connection 320 within a mating surface 302 of the docking station 300. FIG. 12C is a close-up view of the lens block 324 and optical interface portion 325 of the optical connection 320. FIG. 12D depicts a port expanding portion 303 including additional ports or connectors of the docking station 300 depicted in FIGS. 12A-12C.

The exemplary docking station 300 includes a mating portion 301 that extends from a port expansion portion 303. The mating portion 301 has a mating surface 302 that is configured to contact (or nearly contact) a major surface (i.e., a large surface as described above) of the computer 400. In the illustrated embodiment, the mating surface 302 is configured to contact an underside surface 412 of the computer 400. It should be understood embodiments are not limited to the shape and configuration of the mating portion 301 depicted in FIGS. 12A-12D, and that other configurations are also possible. For example, the mating portion 301 may be configured such that the mating surface 302 contacts (or nearly contacts) substantially the entire underside surface 412 of the computer 400 rather than only a portion as depicted in FIGS. 12A-12D. Further, embodiments are not limited to the configuration of the computer 400 depicted in FIGS. 12A-12D as well as FIGS. 13A and 13B. Other computer configurations are also possible.

Referring specifically to FIG. 12B, the optical connection 320 of the illustrated embodiment is disposed in a connector body 304 that extends from the mating surface 302. Accordingly, the optical connection 320 is raised to allow mating into a cavity 434 in the underside 412 of the computer 400 (see FIGS. 13A and 13B). The connector body 304 may be an integral component with the mating portion 301 of the docking station 300. The connector body 304 should be configured to mate with the cavity 434 of the computer 400. As shown in FIG. 12B, the bulk magnetic material of the magnetic coupling portion 322 and the lens block 324 (or optical module providing an optical turn) is provided within the connector body 304. In embodiments, the optical connection 320 may be isolated from the mating portion 301 of the docking station 300 to prevent external forces on the docking station 300 from misaligning the mated optical connections of the computer 400 and the docking station 300. In some embodiments, a metallic shield may be provided to shield electronic components of the docking station 300 from the magnetic field of the magnetic coupling portion 322.

In alternative embodiments, the surface of the optical connection 320 may be substantially planar with the mating surface 302 of the docking station 300 and not raised as depicted in FIGS. 12A and 12B.

The optical connection 320 may be configured as having an in-line optical path as described above, a turned optical path as described above, or as having other optical path configurations. FIG. 12C illustrates a lens block 324 having a plurality of lens elements 326 defining optical channels configured to be aligned with optical channels of a mated optical connection 420 provided on the computer 400. As described above, the lens block 324 may be coupled to a circuit board (not shown) and aligned with active components disposed on the circuit board. In some embodiments, the lens block 324 or optical module may be optically coupled to optical fibers (not shown) disposed within the docking station 300 (e.g., by way of a fiber receiving portion, as described above). The optical fibers may be optically coupled to additional optical connections 320A, 320B that may be present on the port expanding portion 303 of the docking station 300, such as by splitter module, for example.

Additionally, the optical connection 320 may or may not include alignment fiducials 329 for assisting in the alignment of optical channels of the mated optical connections. In the illustrated embodiment, the lens block 324 includes first and second female alignment fiducials 329 adjacent to the optical interface portion 325. As described above, the lens elements 326 (e.g., refractive lenses, gradient-index lenses, and the like) may be covered by a cover (e.g., a glass cover or a plastic cover). The lens block 324 or cover may be provided with a coating, such as an anti-reflective coating, oleophobic coating, hydrophobic coating, and the like. In other embodiments, the lens block 324 may provide for internal lens elements 326 with no cover.

Referring specifically to FIG. 12B, in some embodiments the mating surface 302 of the mating portion 301 may further include one or more alignment pins 309 that are configured to be inserted into alignment bores 409 of the underside surface 412 of the computer 400. The alignment pins 309 and alignment bores 409 may provide coarse alignment of the computer 400 with the docking station 300 and thus the optical connection 420 of the computer 400 with the optical connection 320 of the docking station.

In some embodiments, an electrical connector 307 may also be provided on the mating surface 302 of the docking station 300. The illustrated electrical connector 307, which may be used to provide electrical power to the computer 400 as well as to provide electrical traces for electrical data communication, is configured to mate with a corresponding electrical connector 447 on the underside surface 412 of the computer 400.

Referring now to FIG. 12D, the exemplary docking station 300 includes a port expansion portion 303 having port expansion surface 305. The illustrated port expansion surface 305 includes one or more additional optical connections (e.g., a first additional optical connection 320A and a second additional optical connection 320B) for mating with one or more fiber optic cable assemblies or other devices. It should be understood that any number of additional optical connections may be provided, and that embodiments are not limited to the arrangement of the first and second optical connections 320A, 320B depicted in FIG. 12D. The additional optical connections may be provided to couple the docking station to another electronic device(s) or system(s) by optical communication. Such electronic devices or systems may include, but are not limited to, a storage device, a computing device (e.g., a personal computer or a server), a fiber network (e.g., an in-home fiber network coupled to a fiber-based internet service provider), and a display device.

The exemplary port expansion surface 305 of the docking station 300 depicted in FIG. 12D also includes several electrical ports 330 for receiving electrical connectors of electrical cable assemblies. Exemplary electrical ports may include universal serial bus ports, FireWire® ports, Thunderbolt™ ports, high-definition multimedia interface ports, video graphics array ports, and the like. In other embodiments, no electrical ports 330 may be provided.

Figure 13A:
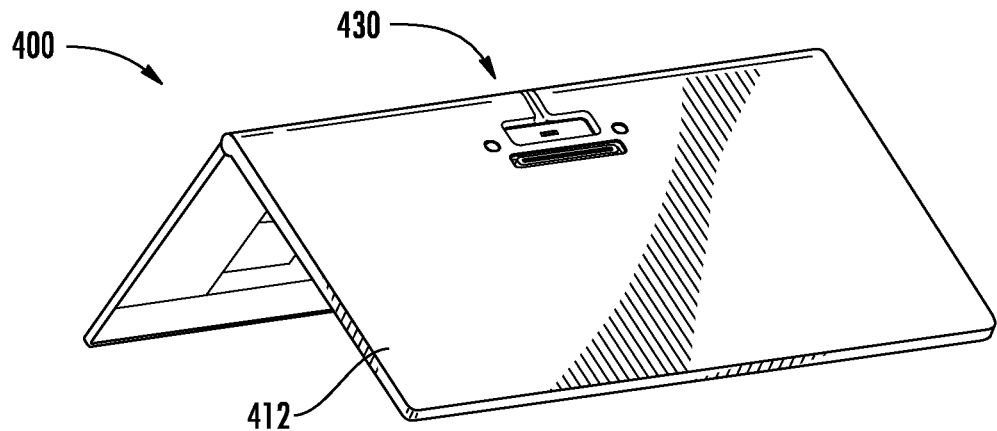
FIG. 13A is an underside perspective view of the electronic device depicted in FIGS. 12A and 12D.
Figure 13B:
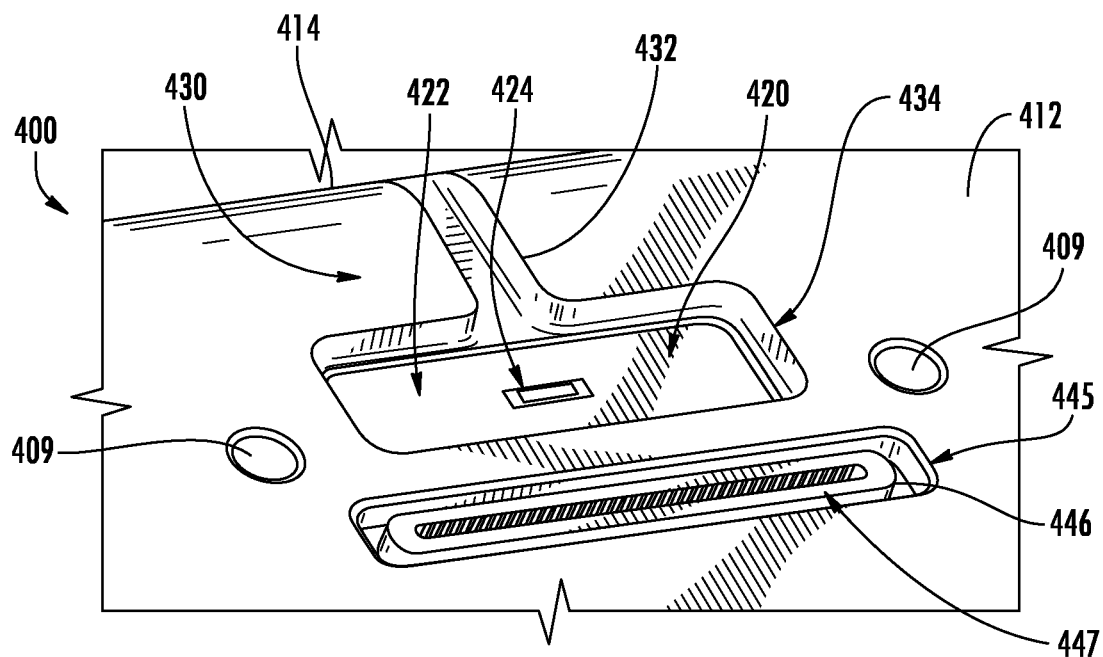
FIG. 13B is a close-up view of the optical connection of the electronic device depicted in FIG. 13A.

FIGS. 13A and 13B depict the exemplary computer 400 configured to mate with the docking station 300 depicted in FIGS. 12A-12D. The computer 400 may be a mobile computer, such as a laptop computer, for example. Embodiments are not limited to the type of computer 400 depicted in FIGS. 13A and 13B. The computer 400 has a housing that defines a major surface that includes an optical connection 420. In the illustrated embodiment, the major surface of the computer 400 is an underside surface 412. However, it should be understood that the optical connection 420 may be provided on other surfaces of the computer 400.

FIG. 13B is a close-up view of the optical connection 420 and other components of the computer 400 depicted in FIG. 13A. A docking region 430 is provided in the underside surface 412 of the computer 400. The example docking region 430 includes a cavity 434 in which an optical connection 420 is disposed, a groove 432 to accept a fiber optic cable of a fiber optic cable assembly, and an electrical connector assembly 445. Also provided are the alignment bores 409 for receiving the alignment pins 309 of the docking station 300, as described above. In alternative embodiments, the groove 432, alignment bores 409, and/or electrical connector assembly 445 may not be provided. In some embodiments, the optical connection 420 may not be disposed in a cavity 434 but rather be substantially planar with respect to the underside surface 412.

The illustrated cavity 434 is configured to receive the connector body 304 of the docking station 300 such that the computer 400 is flat on the mating surface 302 when coupled to the docking station 300. Although the cavity 434 is depicted as being rectangular, embodiments are not limited thereto. The optical connection 420 is disposed within the cavity 434 (e.g., within an opening of the underside surface 412 within the cavity) such that it is exposed for mating with the optical connection 320 of the docking station 300. The optical connection 420 may include a magnetic coupling portion 422 and a lens block 424 (or optical module) as described above. The optical connection 420 may be configured as having an in-line optical path as described above, a turned optical path as described above, or as having other optical path configurations. The optical connection 420 may be isolated from the underside surface 412 of the housing as well as other components of the computer 400. In some embodiments, a metallic shield may be provided to shield electronic components of the computer 400 from the magnetic field of the magnetic coupling portion 422.

The exemplary electrical connector assembly 445 includes an electrical connector cavity 446 in which an electrical connector 447 is configured to mate with the electrical connector 307 of the docking station 300 is positioned. The electrical connector cavity 446 allows the computer 400 to be flat on the mating surface 302 when it is connected to the docking station 300. When coupled, electrical signals may be passed between the two electrical connectors 307, 447.

When the computer 400 is placed on the mating surface 302 of the docking station, the alignment pins 309 (if provided) are positioned within the alignment bores 409 of the computer 400, and the connector body 304 is positioned within the cavity 434. If provided, alignment fiducials on the optical connection 320 of the docking station 300 and the optical connection 420 on the computer 400 (e.g., the male and female cross-shaped alignment fiducials described above, or other differently shaped alignment fiducials) may coarsely align the optical interface portions of the two optical connections 320, 420. The respective magnetic coupling portions 322, 422 provide fine alignment of the optical channels within the mated optical connection 320, 420, as described in detail above. In embodiments, the optical connections 320, 420 may be isolated from their respective housings such that they are free to move in two directions to ensure proper alignment of the optical channels. If provided, the respective electrical connectors 307, 447 are coupled together when the computer 400 is positioned on the docking station 300. FIG. 12D depicts the computer 400 connected to the docking station 300.

Figure 14A:
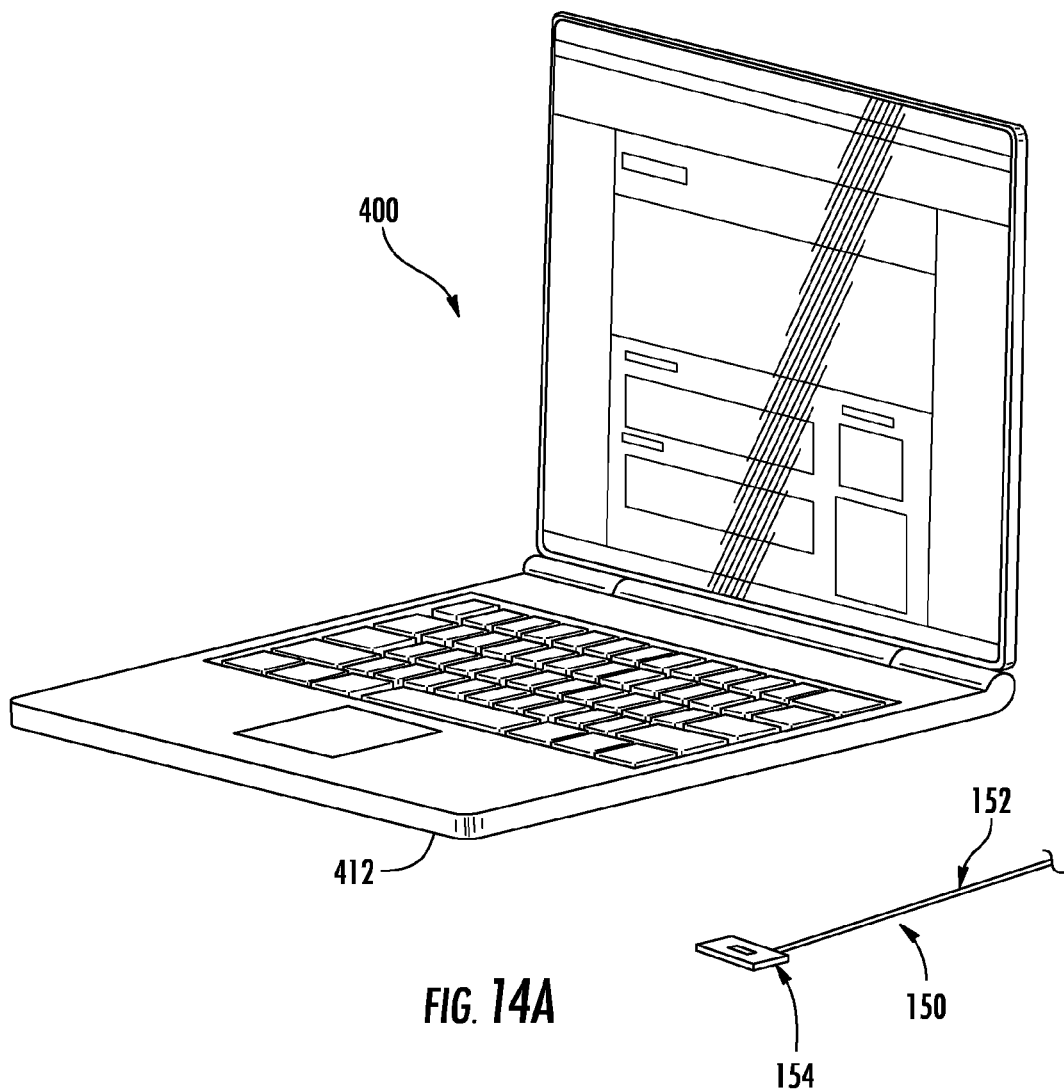
FIG. 14A is a perspective view of an electronic device and a fiber optic cable assembly in a decoupled relationship.
Figure 14B:
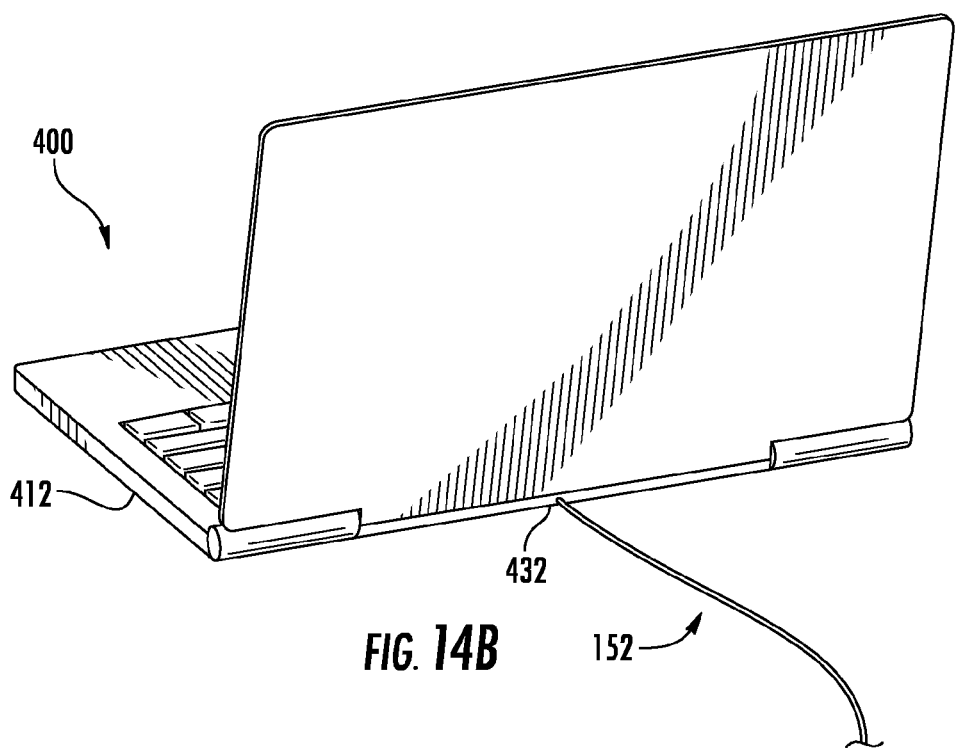
FIG. 14B is a rear perspective view of the fiber optic cable assembly mated to the electronic device depicted in FIG. 14A.
Figure 14C:
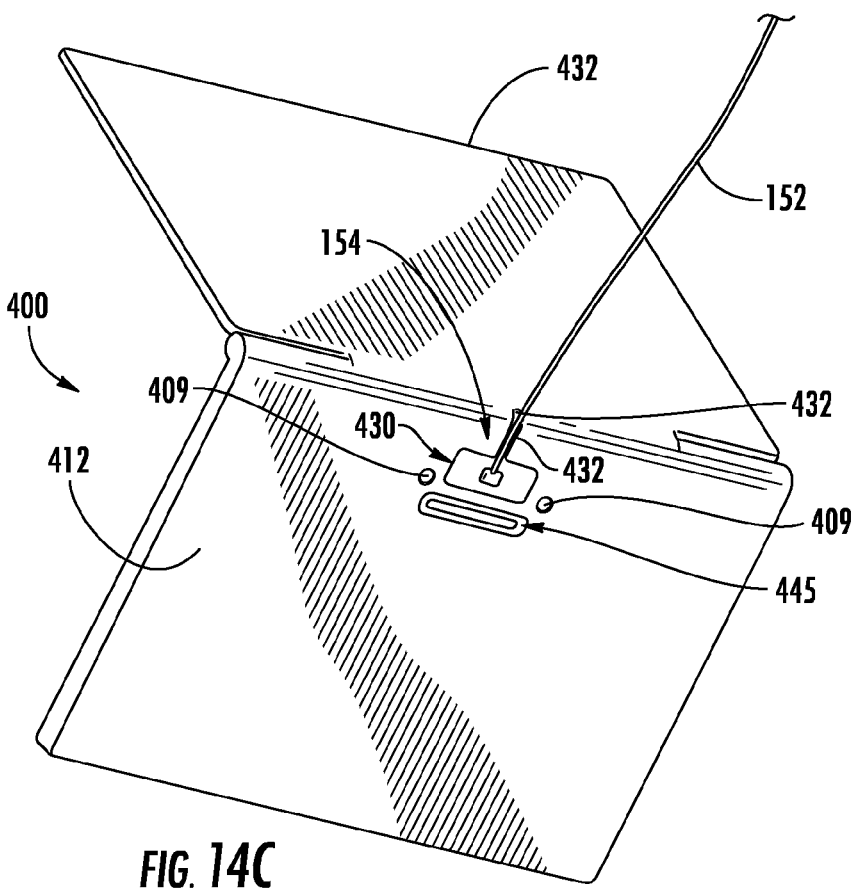
FIG. 14C is an underside view of the fiber optic cable assembly mated to the electronic device depicted in FIGS. 14A and 14B.

In some embodiments, a groove 432 extending from the cavity 434 to a minor surface 414, such as an edge of the computer 400, may be provided so that the computer 400 may accept a fiber optic cable assembly at the underside surface 412. FIGS. 14A-14C depict a fiber optic cable assembly 150 and the computer depicted in FIGS. 12A, 12D, 13A and 13B. As an example and not a limitation, the fiber optic cable assembly 150 may be configured as described above with respect to FIGS. 6A-6C or FIG. 7. Other configurations are also possible.

As shown in FIG. 14A, the fiber optic cable assembly 150 may be positioned beneath the computer 400 such that it approaches the underside surface 412. FIGS. 14A and 14B depict the fiber optic cable assembly 150 coupled to the computer 400. The optical connection 420 of the computer 400 may be capable of being connected to both an optical connection 320 of the docking station 300 and an optical connection 160 of the fiber optic cable assembly 150. In some embodiments, the magnetic force provided by the magnetic coupling portion 162 of the fiber optic cable assembly 150 may be greater than the magnetic force provided by the magnetic coupling portion 322 of the docking station 300 to provide added pull resistance. As shown in FIG. 14C, the fiber optic cable 152 of the fiber optic cable assembly 150 is disposed within the groove 432 in the underside surface 412 of the computer 400 so that the computer 400 may lay flat on a support surface.

The optical connections described herein may also be docking station configured as a cuff or cradle for an electronic device, such as a smart phone, tablet, personal digital assistant, and the like. FIGS. 15A-15C depict a docking station 500 comprising a cuff body 501 having one or more device holding features 503 extending from a mating surface 502. The illustrated docking station 500 may be coupled to a mobile electronic device, such as the mobile electronic device 100 depicted in FIG. 3, for example. The mating surface 502 and the one or more device holding features 503 may have different configurations shown in FIGS. 15A-15C depending on the type of electronic device the docking station 500 is intended to be coupled to.

The mating surface 502 of the docking station 500 is operable to contact a major surface 112 of the electronic device 110 (see FIG. 3). An optical connection 560 is disposed within an opening 505 of the mating surface 502. The optical connection 560, which may be similar to the optical connection 160 of the fiber optic cable assembly 150 depicted in FIGS. 6A-6C, is configured to mate with the optical connection of the electronic device 100. The optical connection 560 provides a turned optical path for optical signals propagating therethrough. The optical connection 560 may include a magnetic coupling portion 562 (e.g., a magnetic coded array) and an optical module 564 providing a turned optical path as described above. In the illustrated embodiment, a fiber optic cable 552 comprising a plurality of optical fibers (not shown in FIGS. 15A-15C) extending from a connector body 554 at a rear surface 504 of the cuff body 501. The plurality of optical fibers may be coupled to a fiber insertion portion of the optical module 564, as described above and shown in FIG. 8. In other embodiments, the fiber optic cable 552 may extend from the rear surface 504 directly rather than from a connector body 554 protruding from the rear surface 504. An opposite end of the fiber optic cable 552 may be coupled to another electronic device(s) or system(s). Such electronic devices or systems may include, but are not limited to, a storage device, a computing device (e.g., a personal computer or a server), a fiber network (e.g., an in-home fiber network coupled to a fiber-based internet service provider), and a display device.

The magnetic coupling portion 562 and the optical module 564 of the optical connection 560 are disposed within the connector body 554. In some embodiments, the optical connection 560 is isolated from the cuff body 501 to allow it to move for proper alignment with an optical connection 120 of a mated electronic device 100. FIGS. 15B and 15C depict a side view of the docking station 500 depicted in FIG. 15A. An opening 570 may be provided on one or more edges 555 of the connector body 554 (or edge of the cuff body 501) to receive a tab 569 of the optical connection 560. The opening 570 and the tab 569 are such that the optical connection 560 has freedom to move in at least two directions when coupled to a mated optical connection 120. The tab 569 may be a portion of the bulk magnetic material, or an intermediate material that maintains the magnetic coupling portion 562. As described above, the mated magnetic coupling portions provide fine alignment between the mated optical connections.

The one or more device holding features 503 are configured to contact one or more minor surfaces of the electronic device 100 (i.e., one or more edges of the electronic device). In the exemplary embodiment depicted in FIGS. 15A-15C, a unitary device holding feature 503 extends from the mating surface 502 and is configured to contact a bottom portion of the electronic device. The device holding feature 503 has a lip portion 507 that is positioned over a front surface of the electronic device when the electronic device is inserted into a recess 506 formed by the device holding feature 503. In this manner, the device holding feature may retain the electronic device in the docking station 500 along with the magnetic forces of the mated magnetic coupling portions.

The optical connections described herein may also be included in docking stations that leverage the processing power present in mobile devices, such as smart phones. More specifically, docking stations may be provided to use the mobile device as a core processor for a larger electronic device, such as a laptop, or a desktop computer.

Figure 16A:
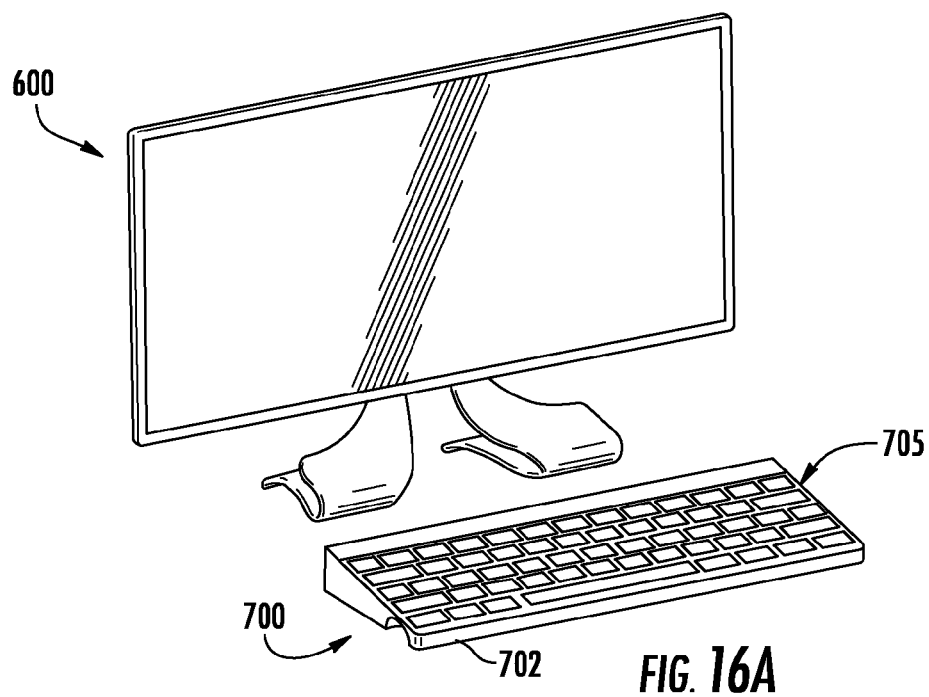
FIG. 16A is a perspective view of a keyboard docking station for a mobile device and a display device.
Figure 16B:
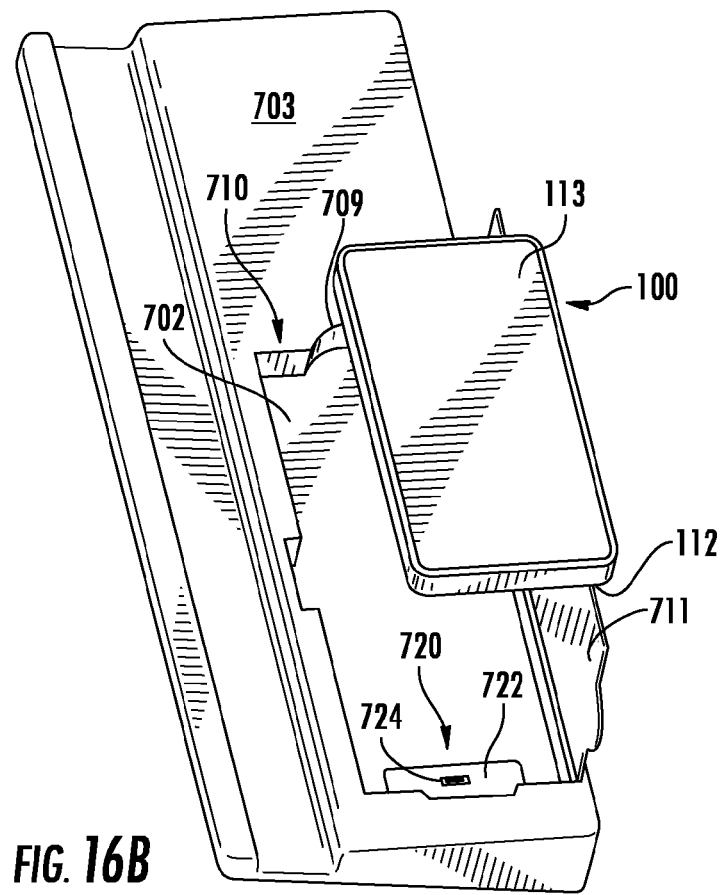
FIG. 16B is an underside view of the keyboard docking station shown in FIG. 16A depicting a cavity for receiving a mobile electronic device.

FIGS. 16A and 16B depict a docking station 700 configured as a keyboard device that is wirelessly, electrically, or optically coupled to a display device 600 to apply the processing power of a mobile electronic device 100 to a larger computer system. For example, a user of a mobile electronic device 100 may desire to use a keyboard and a display device 600 to complete particular tasks, such as preparing a document, for example.

The illustrated docking station 700 comprises an upper keyboard surface 705 that includes a keyboard, such as a QWERTY keyboard, for example. FIG. 16B depicts an underside surface 703 of the docking station 700 that includes a storage cavity 710 configured to receive an electronic device 100, such as smart phone, for example. The storage cavity 710 includes a mating surface 702 having an optical connection 720 disposed therein. The optical connection 720 may be configured as having an in-line optical path as described herein, a turned optical path as described herein, or another optical path configuration. The optical connection 720 includes a magnetic coupling portion 722 as described above, as well as a lens block 724 (or an optical module having a TIR surface) providing an optical interface portion. The magnetic coupling portion 722 is magnetically coupled to a corresponding magnetic coupling portion 122 of an optical connection 120 of the electronic device 100 (see FIG. 3).

A flap 711 may be provided to enclose the electronic device 100 within the storage cavity 710 when in a closed position. A notch 709 may also be provided to enable a user to remove the electronic device 100 from the storage cavity 710. Optical communication is provided between the electronic device 100 and the docking station 700 via the mated optical connections 720 and 120.

During operation, a user may use the keyboard to operate the enclosed electronic device 100, and receive visual feedback via the display device 600. The keyboard may be in communication with the electronic device 100 via the mated optical connections 720 and 120. As an example and not a limitation, the visual information (e.g., graphical user interfaces, videos, photos, and the like) normally intended for the native display screen 113 of the electronic device 100 may be communicated to the docking station 700 via optical signals passed between the optical connections 120 and 720. The visual information may then be provided to the display device 600 wirelessly or by wired communication (e.g., by an electrical cable assembly, a fiber optic cable assembly, or a hybrid electro-optical cable assembly).

In alternative embodiments, the keyboard docking station 700 and the display device 600 may be incorporated into a single device resembling a laptop computer or a desktop computer. Such a device may be considered a terminal device because the processing power will be provided by the electronic device inserted thereto.

Figure 17A:
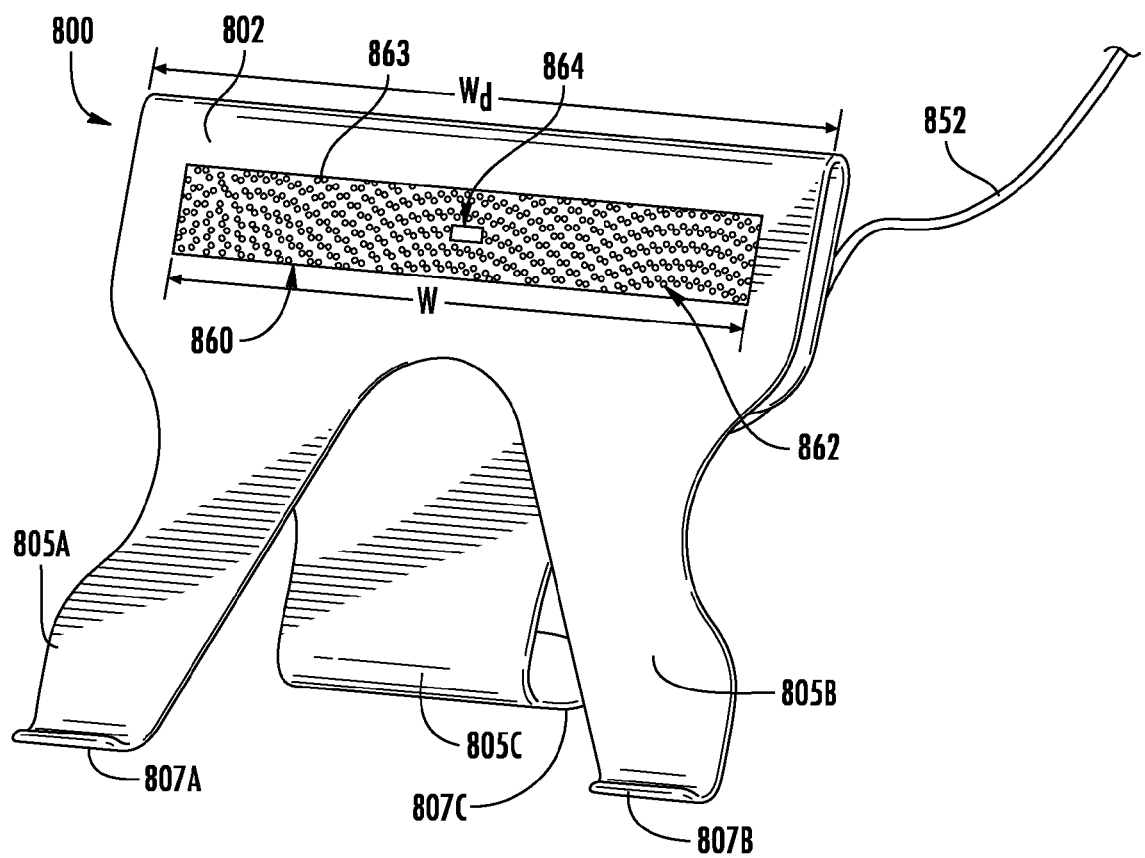
FIG. 17A is a front perspective view of a tablet docking station having an optical connection in a mating surface.
Figure 17B:
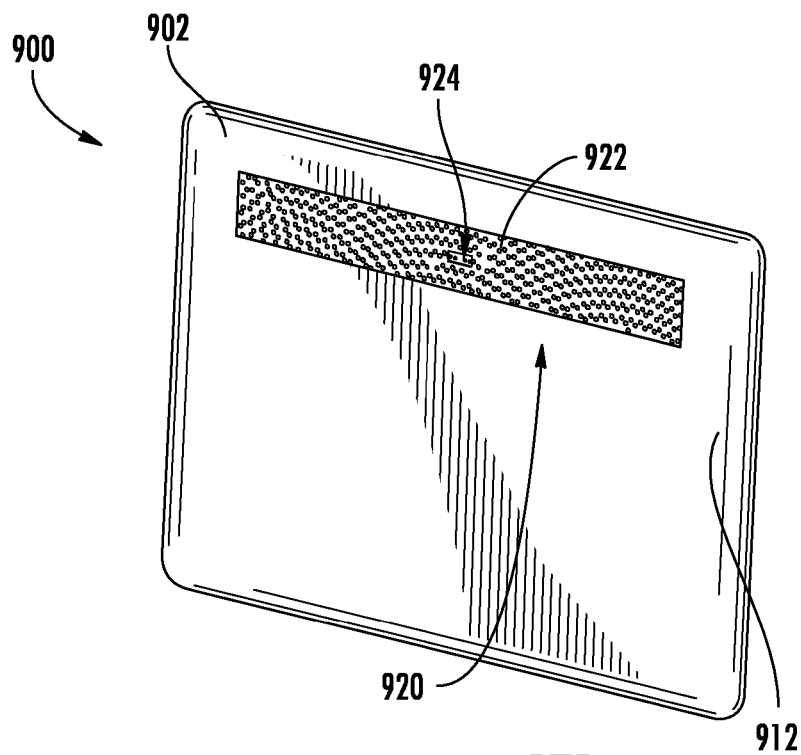
FIG. 17B is a rear perspective view of a tablet computer configured to be docked on the tablet docking station depicted in FIG. 17A.
Figure 17C:
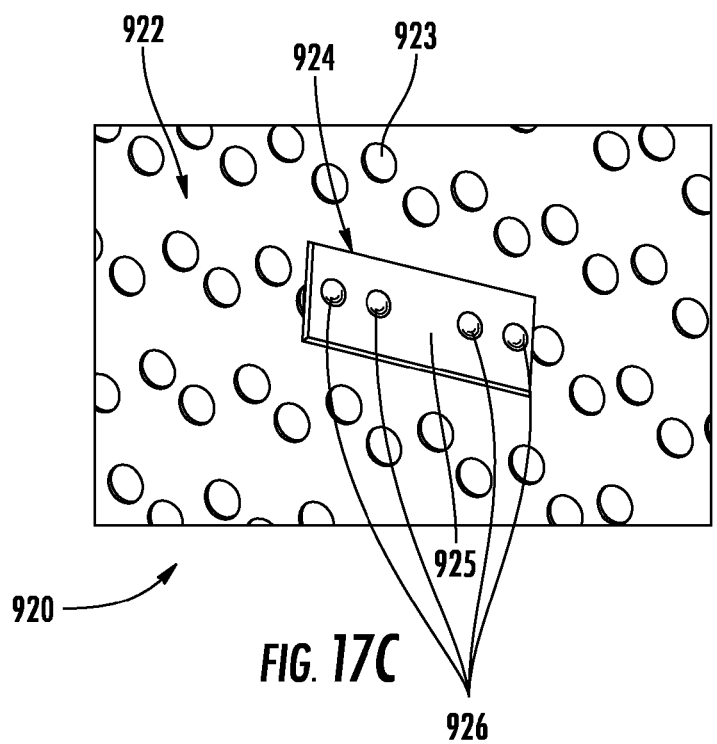
FIG. 17C is a close-up view of a lens module of an optical connection of the tablet computer depicted in FIG. 17B.
Figure 17D:
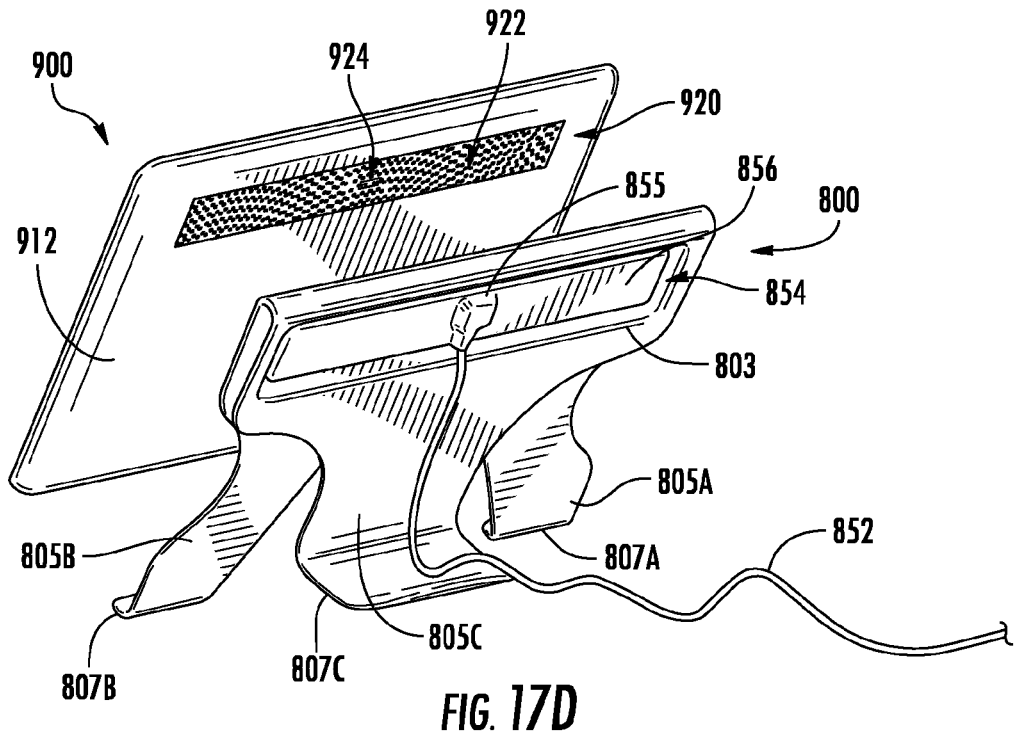
FIG. 17D is a rear perspective view of the tablet computer and the docking station of FIGS. 17A-17C in a decoupled relationship.
Figure 17E:
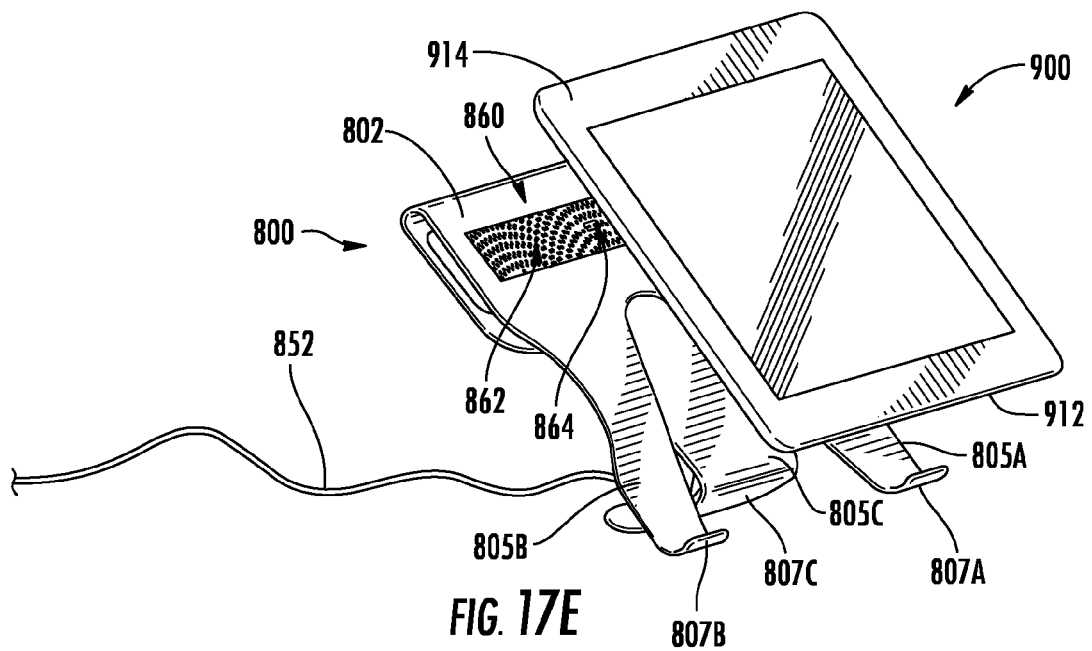
FIG. 17E is a front perspective view of the tablet computer and the docking station of FIGS. 17A-17C in a decoupled relationship.
Figure 17F:
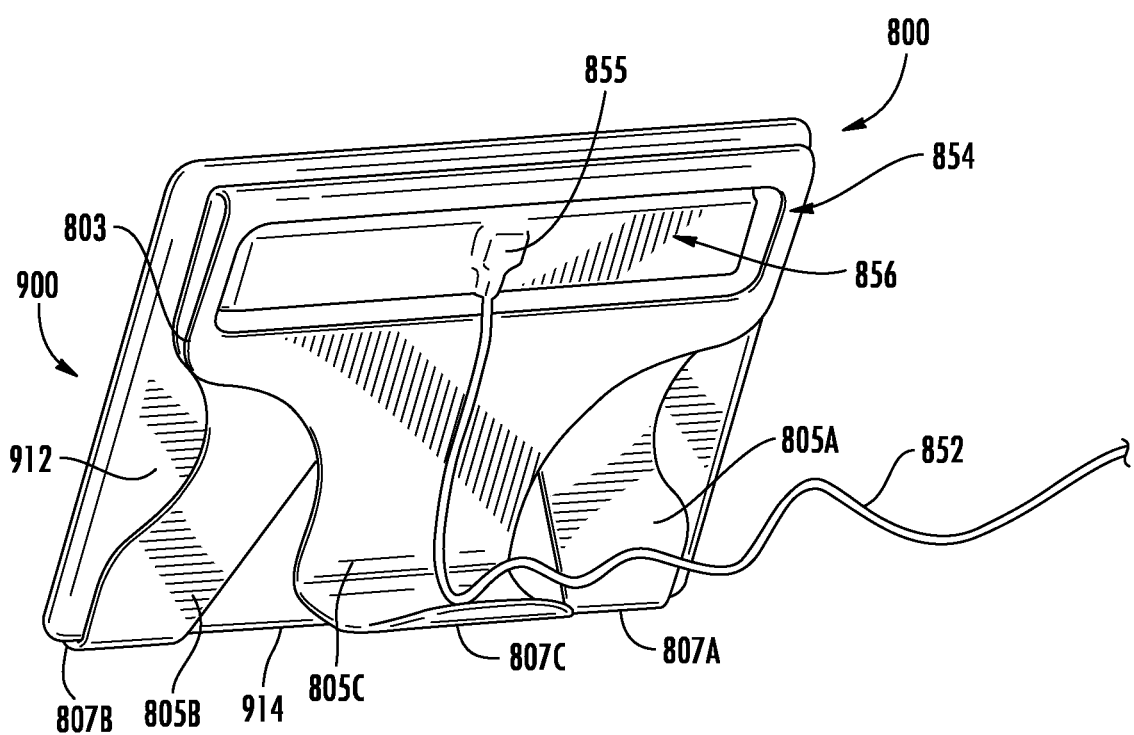
FIG. 17F is a rear perspective view of the tablet computer mated to the docking station of FIGS. 17A-17E.

Optical connections described herein may also be provided in a docking station for a mobile device such as a tablet computer. FIGS. 17A-17F depict an exemplary docking station 800 configured as a stand for a tablet computer 900. FIG. 17A is a front view of the docking station 800, FIG. 17B is a rear view of an exemplary tablet computer 900, and FIG. 17C is a close-up view of a lens block 924 of an optical connection 920 on the tablet computer 900. FIGS. 17D and 17E are rear and front views respectively of the docking station 800 and the tablet computer 900 in a decoupled relationship, while FIG. 17F is a rear view of the docking station 800 and the tablet computer 900 in a coupled relationship.

Referring specifically to FIG. 17A, the illustrated docking station 800 comprises a mating surface 802 configured to contact a major surface 912 of the tablet computer 900 (i.e., the rear surface of the tablet computer 900), and an opposing, rear surface 803. Extending from the mating surface 802 are first and second legs 805A, 805B each having an end 807A, 807C. Extending from the rear surface is a third leg 805C also having an end 807C. The ends 807A-807C of the legs define a support plane which is aligned with a support surface, such as a countertop, table, desk, and the like. The mating surface 802 is transverse to the support plane. In other words, the legs 805A-805C support the docking station 800 and the tablet computer 900 such that the mating surface 802 and the docked tablet computer 900 are angled with respect to the support surface in an easel-like arrangement.

It should be understood that the configuration of the tablet docking station 800 depicted in FIGS. 17A-17F is for illustrated purposes only, and other configurations are possible. For example, embodiments may include more than three legs, or, alternatively, no legs at all. For example, the tablet docking station 800 may include a base (not shown) rather than legs, and a mating surface 802 transverse to the base that is operable to hold the tablet computer 900.

In the illustrated embodiment, the ends 807A and 807B of the legs 805A and 805B curve to support the docked tablet computer 900. In other words the ends 807A and 807B may support a minor surface 914 (i.e., edge) of the tablet computer 900 (see FIG. 17F).

The mating surface includes an optical connection 860 configured to mate with an optical connection 920 of the tablet computer 900. In the illustrated embodiment, the optical connection 860 includes a magnetic coupling portion 862 configured as a coded magnetic array having a plurality of magnetic regions 863. The magnetic coupling portion 862 has a width w that spans a majority of the width $w_d$ of the mating surface 802 of the docking station 800. In other embodiments, the width w of the magnetic coupling portion 862 may be shorter (e.g., less than a majority of the width $w_d$ of the mating surface 802 of the docking station 800). The large area of the magnetic coupling portion 862 may provide high accuracy for alignment of the mated optical channels.

The optical connection 860 of the illustrated embodiment includes an optical module 864 that provides an optical turn for optical signals propagating therein. For example, the optical module 864 may be configured as the optical module 164 of the fiber optic cable assembly 150 described above. However, in other embodiments, the optical connection 860 may include a lens module providing an in-line optical path as described above (see FIGS. 2 and 8). Lens elements, if provided, may be configured as covered refractive lenses or gradient-index lenses, for example. Embodiment may or may not include alignment fiducials (e.g., cross-shaped alignment fiducials) as described above.

Referring now to FIG. 17D, the optical connection 860 may be disposed in a connection housing 854. In some embodiments, the connection housing 854 and/or the optical connection 860 is isolated from the mating surface 802 and remaining components of the docking station 800. In such embodiments, the legs 805A-805C (or other support structure, which has a base) may support the gravity load of the tablet computer 900 and the optical connection 860 is free to move to the desired position for mating with a corresponding optical connection 920 of the tablet computer 900.

The connection housing 854 may further include a module body 855 that maintains the optical module 864. A fiber optic cable 852 comprising a plurality of optical fibers extends from the module body 855. An opposite end of the fiber optic cable 852 may be coupled to another electronic device(s) or system(s). Such electronic devices or systems may include, but are not limited to, a storage device, a computing device (e.g., a personal computer or a server), a fiber network (e.g., an in-home fiber network coupled to a fiber-based internet service provider), and a display device.

The optical module 864 may include an optical interface portion, a TIR surface, and a fiber insertion portion as described above with respect to the fiber optic cable assembly depicted in FIGS. 6A-6C. Accordingly, the optical module 864 may turn optical signals to and from the plurality of optical fibers. In other embodiments, the module body 855 may be integral with the rear surface 803 of the docking station 800 rather than extending from a connection housing 854.

Referring now to FIGS. 17B-17D, a tablet computer 900 includes an optical connection 920 in a major surface (i.e., the rear surface) configured to mate with the optical connection 860 of the docking station 800. In embodiments, the optical connection 920 includes a magnetic coupling portion 922 configured as a coded magnetic array operable to mate with the magnetic coupling portion 862 of the docking station 800 optical connection 860 by magnetic attraction. Accordingly, the tablet computer 900 may be coupled to the docking station 800 via structureless optical connections.

The optical connection 920 further includes a lens block 924 providing an optical interface 925 with an in-line optical path, such as described above with respect to FIGS. 2 and 8. In other embodiments, the optical connection of the tablet computer 900 may provide a turned optical path. The lens elements 926 provided within the lens block 924 may be refractive lenses, gradient-index lenses, and the like.

In embodiments, the optical connection 920 may be isolated from the housing of the tablet computer 900 such that it is free to move into position to mate with the optical connection 860 of the docking station 800. FIG. 17F depicts the tablet computer 900 docked with the docking station 800.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A docking station for an electronic device, the docking station comprising:
   a mating surface; and
   an optical connection disposed in the mating surface, the optical connection comprising an optical interface portion and a magnetic coupling portion disposed about at least a portion of the optical interface portion, wherein the optical interface portion comprises at least one alignment fiducial.

2. The docking station of claim 1, wherein the magnetic coupling portion comprises at least one coded magnetic array comprising a plurality of magnetic regions magnetized according to a magnetic coding pattern.

3. The docking station of claim 1, wherein the optical connection is isolated from the mating surface.

4. The docking station of claim 1, further comprising a circuit board having one or more active components, wherein the optical interface portion is aligned over the one or more active components.

5. The docking station of claim 1, wherein:
   the optical connection further comprises a lens block that defines the optical interface portion;
   the lens block comprises a lens surface comprising a lens element; and
   the lens block defines an in-line optical path without an optical turn for optical signals propagating through the lens block.

6. The docking station of claim 1, wherein:
   the optical connection further comprises an optical module that defines the optical interface portion; and
   the optical module comprises a total internal reflection (TIR) surface operable to turn optical signals within the optical module by total internal reflection, thereby providing a turned optical path.

7. The docking station of claim 1, wherein the optical connection further comprises a connector body extending from the mating surface, and the optical connection is disposed within the connector body.

8. The docking station of claim 7, further comprising a port expansion surface comprising one or more electrical ports, one or more optical ports, or combinations thereof.

9. The docking station of claim 1, wherein the mating surface is transverse to a support plane of the docking station.

10. The docking station of claim 9, wherein the magnetic coupling portion extends across a majority of a width of the mating surface.

11. The docking station of claim 9, further comprising a fiber optic cable comprising a plurality of optical fibers, wherein:
    the optical connection further comprises an optical module defining the optical interface portion, the optical module comprising:
       a total internal reflection (TIR) surface operable to turn optical signals within the optical module by total internal reflection, thereby providing a turned optical path; and
       a fiber receiving portion comprising a plurality of fiber guides for receiving and securing the plurality of optical fibers to the optical module.

12. The docking station of claim 9, wherein the optical connection is isolated from the mating surface.

13. The docking station of claim 1, further comprising a plurality of legs, each leg having an end, wherein the ends of the plurality of legs define a support plane, and the mating surface is transverse to the support plane.

14. The docking station of claim 1, further comprising one or more device holding features extending from the mating surface.

15. The docking station of claim 1, further comprising:
    a storage cavity configured to receive an electronic device, wherein the mating surface is disposed within the storage cavity; and
    a keyboard surface comprising a keyboard, wherein the keyboard is communicatively coupled to the optical connection.

16. An electronic device comprising:
    a minor surface defining an edge of the electronic device;
    a major surface comprising a cavity, wherein the major surface is transverse to the minor surface; and
    an optical connection disposed in the cavity, the optical connection comprising an optical interface portion and a magnetic coupling portion disposed about at least a portion of the optical interface portion.

17. The electronic device of claim 16, wherein the magnetic coupling portion comprises at least one coded magnetic array comprising a plurality of magnetic regions magnetized according to a magnetic coding pattern.

18. The electronic device of claim 16, wherein the optical connection is isolated from the major surface.

19. The electronic device of claim 16, wherein the optical interface portion comprises at least one alignment fiducial.

20. The electronic device of claim 16, further comprising a groove extending from the cavity.

21. The electronic device of claim 16, wherein the optical connection further comprises a lens block that defines the optical interface portion and provides an in-line optical path without an optical turn for optical signals propagating through the lens block.

22. The electronic device of claim 16, wherein:
the optical connection further comprises an optical module that defines the optical interface portion; and
the optical module comprises a total internal reflection (TIR) surface operable to turn optical signals within the optical module by total internal reflection, thereby providing a turned optical path.

23. The electronic device of claim 16, further comprising a circuit board having one or more active components, wherein the optical interface portion is aligned over the one or more active components.

24. A display device comprising:
an optical connection disposed in a mating surface, the optical connection comprising:
a lens block comprising an optical interface portion that defines an in-line optical path without an optical turn for optical signals propagating through the lens block; and
a magnetic coupling portion disposed about at least a portion of the lens block,
wherein the mating surface is proximate a rear surface of the display device, and the optical connection is substantially planar with respect to the mating surface.

25. The display device of claim 24, wherein the magnetic coupling portion comprises at least one coded magnetic array comprising a plurality of magnetic regions magnetized according to a magnetic coding pattern.

\* \* \* \* \*